US008666298B2

(12) United States Patent
Liang et al.

(10) Patent No.: US 8,666,298 B2
(45) Date of Patent: Mar. 4, 2014

(54) DIFFERENTIATED, INTEGRATED AND INDIVIDUALIZED EDUCATION

(75) Inventors: Changnian Liang, Shanghai (CN); Pingyi Yan, ShenZhen (CN); Xiaofeng Zhang, Hangzhou (CN); Yuan Li, ShenZhen (CN)

(73) Assignee: Coentre Ventures LLC, Protland, OR (US)

( * ) Notice: Subject to any disclaimer, the term of this patent is extended or adjusted under 35 U.S.C. 154(b) by 1197 days.

(21) Appl. No.: 12/121,249

(22) Filed: May 15, 2008

(65) Prior Publication Data

US 2009/0287619 A1 Nov. 19, 2009

(51) Int. Cl.
*G09B 3/00* (2006.01)

(52) U.S. Cl.
USPC ............................ 434/350; 434/322; 434/323

(58) Field of Classification Search
USPC ......................................... 434/322–323, 350
See application file for complete search history.

(56) References Cited

U.S. PATENT DOCUMENTS 5,033,969 A * 7/1991 Kamimura .................... 434/322
5,302,132 A * 4/1994 Corder .......................... 434/156
5,441,415 A * 8/1995 Lee et al. ...................... 434/350
5,597,312 A * 1/1997 Bloom et al. ................. 434/362
5,616,033 A * 4/1997 Kerwin ......................... 434/118
5,727,951 A 3/1998 Ho et al.
5,810,605 A * 9/1998 Siefert .......................... 434/362
5,870,731 A * 2/1999 Trif et al. ........................ 706/52
5,885,087 A * 3/1999 Thomas ........................ 434/323
6,164,975 A * 12/2000 Weingarden et al. ......... 434/322
6,190,178 B1 2/2001 Oh
6,213,780 B1 * 4/2001 Ho et al. ....................... 434/219
6,270,351 B1 8/2001 Roper
6,470,170 B1 10/2002 Chen et al.
6,513,532 B2 * 2/2003 Mault et al. ................... 600/595
6,554,618 B1 * 4/2003 Lockwood .................... 434/322
6,652,283 B1 * 11/2003 Van Schaack et al. ........ 434/236
6,729,884 B1 * 5/2004 Kelton et al. ................. 434/236
6,801,751 B1 10/2004 Wood et al.
6,944,596 B1 9/2005 Gray et al.
7,052,277 B2 * 5/2006 Kellman ....................... 434/118
7,865,394 B1 * 1/2011 Calloway et al. ............ 705/14.4
2002/0098468 A1 7/2002 Barrett et al.

(Continued)

OTHER PUBLICATIONS

Non-Final Office Action for U.S. Appl. No. 12/323,331, mailed on Feb. 9, 2012, Changnian Liang et al., "Self-Adaptive Study Evaluation", 14 Pages.

(Continued)

*Primary Examiner* — Robert J Utama
(74) *Attorney, Agent, or Firm* — Lee & Hayes, PLLC

(57) ABSTRACT

A computer-based learning system uses knowledge points organized with a predefined multilevel arrangement. Each knowledge point has an information set which may include a knowledge content, an evaluation content and a solution content. For a given knowledge point, the learning system provides the knowledge content and evaluation content, analyzes the user's answers to the evaluation content and determines the next knowledge point to be studied by the user based on the user's answers and the predefined multilevel arrangement of the knowledge points. The learning system thus provides a different learning course for different users to achieve individualized learning. User's learning history may be recorded to facilitate reviews by the user and improve the selection of the next knowledge point. Users may provide feedbacks on knowledge contents and evaluation contents, and may even suggest their own knowledge contents and evaluation contents to improve the learning system and user participation.

44 Claims, 9 Drawing Sheets

(56) References Cited

U.S. PATENT DOCUMENTS

| | | | | |
|---|---|---|---|---|
| 2002/0120593 | A1* | 8/2002 | Iemoto et al. | 706/16 |
| 2002/0138590 | A1 | 9/2002 | Beams et al. | |
| 2002/0142278 | A1* | 10/2002 | Whitehurst et al. | 434/350 |
| 2002/0156632 | A1 | 10/2002 | Haynes et al. | |
| 2002/0161732 | A1 | 10/2002 | Hopp et al. | |
| 2002/0187462 | A1* | 12/2002 | Mariappan | 434/350 |
| 2003/0008269 | A1 | 1/2003 | Helmick et al. | |
| 2003/0084015 | A1 | 5/2003 | Beams et al. | |
| 2003/0129574 | A1* | 7/2003 | Ferriol et al. | 434/362 |
| 2003/0227479 | A1* | 12/2003 | Mizrahi et al. | 345/753 |
| 2003/0232319 | A1 | 12/2003 | Grisham et al. | |
| 2004/0033475 | A1* | 2/2004 | Mizuma et al. | 434/219 |
| 2004/0063085 | A1 | 4/2004 | Ivanir et al. | |
| 2004/0096811 | A1* | 5/2004 | Anneswamy et al. | 434/365 |
| 2005/0026131 | A1* | 2/2005 | Elzinga et al. | 434/365 |
| 2005/0033617 | A1* | 2/2005 | Prather et al. | 705/7 |
| 2006/0115803 | A1* | 6/2006 | Kalisiak | 434/323 |
| 2006/0184486 | A1 | 8/2006 | Taggart et al. | |
| 2009/0017436 | A1* | 1/2009 | Sumrall et al. | 434/433 |
| 2009/0047648 | A1* | 2/2009 | Ferreira | 434/323 |

OTHER PUBLICATIONS

Crago, "How to Force a Hyperlink to Open a New Browser Window", retrieved from www.internetmarketingsolution.com on Jul. 16, 2011, Apr. 2007, 3 pages.

Office Action for U.S. Appl. No. 12/168,777, mailed on Jul. 20, 2011, Liang et al., "User Interface for Individualized Education".

Final Office Action for U.S. Appl. No. 12/323,331, mailed on Jun. 8, 2012, Changnian Liang et al., "Self Adaptive Study Evaluation", 13 Pages.

PCT International Search Report for PCT/US2009/065379, dated Jun. 25, 2010, 3 pages.

* cited by examiner

DIFFERENTIATED, INTEGRATED AND INDIVIDUALIZED EDUCATION

TECHNICAL FIELD

This disclosure relates to the field of computer systems, and particularly computer-based learning systems and methods for individualized learning.

BACKGROUND

As Internet becomes widely popular, multiple Internet-based education systems emerge. These Internet-based education systems are usually based on a website which provides knowledge contents to users. The knowledge contents are either simply listed as information or organized according to conventional education systems such as school grades and related curriculums. There is no coherent organization of knowledge that is functionally designed to take advantage of the modern computer technologies, particularly the power of Internet. The utilization of Internet in the existing Internet-based education systems is limited to the convenience of access only, which is dominantly a feature of the primitive Internet, the so-called Web 1.0, but not for taking advantage of the rapidly developing computer systems and Internet technologies.

Conventional teaching materials, such as teaching programs, teaching curriculums, courses, training programs and training syllabus, even if comprehensively implemented on the Internet to be made easily accessible by users, still fall far short of the promises of the growing revolution of the second-generation Internet, Web 2.0. First, these teaching materials, and the system and methods that come along with them, cannot provide true individualized learning. Second, they do not adequately promote user-to-user (peer-to-peer) interaction. Third, they do not take advantage of the dynamic nature of an Internet-based computer system. Fourth, they do not take advantage of the collective intelligence and automatic self-learning power of an Internet-based computer system.

For example, in a typical education website, each time a user logs onto the website, a fixed webpage appears first, which allows the user select a particular learning content, do some reading, and do some exercises or take a test. One problem with such design is that the education system usually provides disconnected or random study subjects, or static knowledge content, and is thus unsuitable for achieving efficient studies by students of various levels and various learning abilities. As a whole, the learning may be either a casual ad hoc learning of separate (or even random) topics, or a rigid course study following a fixed curriculum pre-prescribed by the system. In general, the existing education systems also require guidance or instructions of an instructor (e.g., a parent or teacher) in order for the learning process to continue. In addition, if the learning content for the user is continuous from the previous one, the user need to recall the previously studied learning content and go back to the end of last learning content in each login. This not only wastes the time of the user, but also leads to a greatly diminished user experience.

Furthermore, in existing Internet-based education systems, the learning history of the user is normally not recorded, much less analyzed and organized by the system to improve learning. The fixed knowledge content and teaching method thus do not consider the actual learning process of each individual, and further do not allow user feedback to the system except for answering questions or finishing assigned exercises, tests or homework. As a result, active user participation is greatly limited. In addition, due to the lack of learning history information, the existing education websites are incapable to identify the weak points of a student's knowledge and learning to achieve focused improvement.

As a result, learning efficiency in existing education systems often falls far short of the potential of an individual. These education systems are characterized by rigid contents and generic (versus individualized or personalized) tests, and inflexible user interface and mechanical presentation. This not only leads to waste of resources but also results in discouragement, fatigue, tiredness and boredom of people who are trying to learn. Such are characteristics of a rigid teaching system with fixed materials, fixed standard, and fix communication channel.

Although some education websites attempt to counter some of these problems by offering a certain level of customization, such as a slightly different teaching material for each individual, the concept of the present online education is still largely built on the conventional concept of using static curriculums to teach a pre-formulated class or grade, and thus still fall short of the promise of Web 2.0. Changes to the conventional concept have been limited to external modifications rather than fundamental reconstruction. The existing learning systems, including the Internet-based ones, thus fall into a suppressing mode in which the student is forced to optimize his or her learning to adapt to the system, rather than a flexible supportive system that automatically adapts to the student with an aim to teach the student to his or her unique and highest potential.

SUMMARY

In order to solve the shortcomings of existing Internet-based education systems, this disclosure describes a learning system based on differentiated and structured knowledge points which are organized in a predefined multilayer arrangement. The predefined multilayer arrangement of the knowledge points has a structure that is pertinent to the particular nature of the subject matter to be studied, and is systematically defined with fine differentiation of the knowledge points suited for Internet-based learning. Each knowledge point has an information set which may include a knowledge content, an evaluation content and a solution content. For a given knowledge point, the learning system uses an interactive user interface to provide the knowledge content and evaluation content, analyzes the user's answers to the evaluation content and determines the next knowledge point to be studied by the user based on the user's answers and the predefined multilevel arrangement of the knowledge points. Because each user may have unique user feedback and user selections (depending on the study interest, knowledge level and learning capabilities of the user), the learning system thus provides different learning courses for different users to achieve individualized learning.

One aspect of the disclosure is a method using a computer-based learning system to provide individualized learning. The learning system has a storage storing multiple knowledge points and information sets of the knowledge points organized in a predefined multilayer arrangement. Each information set includes knowledge content, evaluation content and corresponding solutions of the evaluation content. The learning system first determines a present knowledge point to be studied by the user, and subsequently provides to the user at least one information content of the information set associated with the present knowledge point. The provided information may include an evaluation content, and may also include a knowledge content and other contents. The learning system evaluates a study result of the user with respect to the present knowledge point, by analyzing a user feedback entered through a user terminal in response to the information (e.g., the evaluation content) provided to the user, and determines a next knowledge point to be studied by the user based on the study result and the predefined multilevel arrangement of the knowledge points.

In some embodiments, the user is directed to a preparatory knowledge point before proceeding to the present knowledge point or the next knowledge point. Alternatively, the next knowledge point to be studied by the user is a preparatory knowledge point to a further knowledge point to be studied by the user later. The preparatory knowledge points may be determined based on the evaluation of the study results and/or indications contained in the knowledge points and the predefined multilayer arrangement.

In other embodiments, user's learning history may be recorded to facilitate reviews by the user at any time and/or to help determine the next knowledge point to be studied. Users may provide feedbacks to knowledge contents and evaluation contents, and may even suggest their own knowledge contents and evaluation contents to improve the learning system and the user participation.

Another aspect of this disclosure is a computer-based learning system that has a computer storage storing data for multiple information sets each associated with at least one of knowledge points organized according to a predefined multilevel arrangement. Each information set having at least one information content which is a knowledge content, an evaluation content or a solution content. The computer-based learning system also has a user interaction unit adapted to interact with a user through a user terminal by receiving the user input and providing to the user the at least one information content of an information set associated with a present knowledge point selected to be studied by the user. The computer-based learning system further has a processing unit adapted to determine the present knowledge point to be studied by the user, evaluate a study result of the user with respect to the present knowledge point by analyzing a user feedback entered through the user terminal in response to the at least one information content provided, and determine a next knowledge point to be studied by the user based on the study result.

Combined with the predefined multilevel arrangement of knowledge points, the method and the system described in this disclosure provide a different learning course for different users. The study content and the evaluation content may vary from user to user, thus realizing individualized study. At the same time, the learning system may also record the learning history of each user to facilitate reviews by user at any time and to help determine the next knowledge point to be studied. The method and the system encourage the users to provide or suggest their own knowledge content and evaluation content, and further receive user feedbacks on the knowledge contents and evaluation contents to allow more user participation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
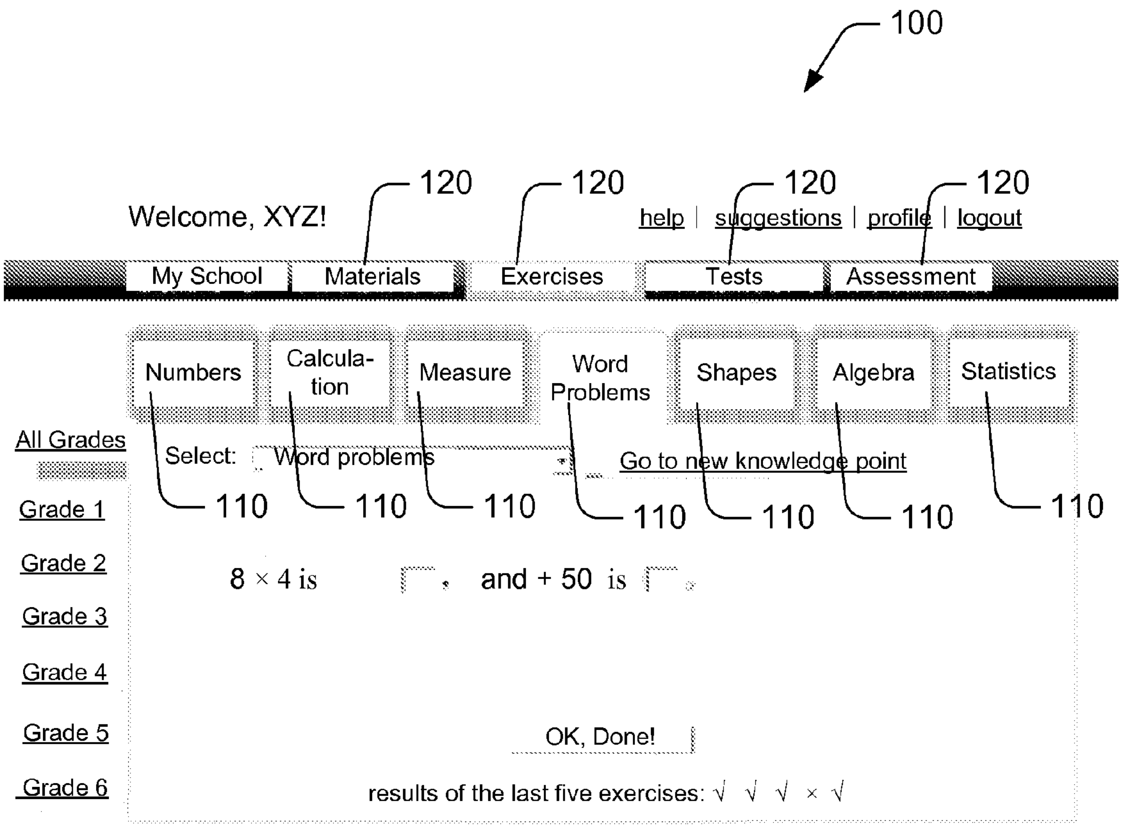
FIG. 1 illustrates a webpage of an exemplary learning system in accordance with the present disclosure.

Prior to describing the exemplary embodiments of the present learning system and method, this disclosure first explains some of the technical terms used herein.

Knowledge point: a knowledge point is a cognitive element of a body of knowledge, such as a branch of science, a combination of several related sciences, an educational course, or any subject of learning. According to the laws of human cognition and specific applications of the knowledge, knowledge of a subject is differentiated into multiple knowledge points. Such differentiation is usually multilayered and may reach the most elemental knowledge points, beyond which further differentiation is no longer practical or helpful for the learning purpose. For instance, arithmetic, a subject of entry-level Mathematics, can be differentiated into multiple first level knowledge points such as “Numbers”, “Calculations”, “Measures”, “Applications” (or “Word Problems”) and “Shapes”. The first level knowledge point “Numbers” can be further differentiated into several second level knowledge points such as “Concept of Numbers”, “Integers”, “Decimals”, “Fractions”, “Divisions”, “Fraction and Percentage” and “Ratio and Proportion”. By the same token, each second level knowledge point may be further differentiated into multiple third level knowledge points.

Knowledge content: a knowledge content is a description of the concepts related to one or more knowledge points. Alternatively or additionally, the knowledge content is a description of how to apply the knowledge of a knowledge point. A knowledge content may be embodied in various forms including text, graphics and images (static or animated), audio, video and multimedia. A knowledge content is usually instructional. A knowledge content may be similar to the content of a topic in a traditional teaching curriculum or a description of a topic adopted in the textbook. In the present disclosure, a knowledge content may be either system-provided (e.g., pre-written by experts and stored in the learning system) or user-provided, as described herein.

Evaluation content: an evaluation content in this description may refer to a material used for various purposes including evaluation, diagnosis and user practices, and may include exercises, quiz questions and comprehensive evaluation questions designed with respect to one or more knowledge points. An evaluation content may or may not include answers to the exercises and questions. Evaluation contents may be carefully selected and arranged in order to efficiently help users to learn the knowledge content by maximizing study efficiency and avoiding burying students with an excessive number of tests and problems. Answers may include the final answers to the questions in the evaluation content and may also include the work processes that lead to the correct answers. An evaluation content and answers may be embodied in various forms including text, graphics and images (static or animated), audio, video and multimedia.

Predefined multilevel arrangement: a predefined multilevel arrangement is an organizational structure of multiple knowledge points of a certain subject or a combination of subjects to be learned by a user. The knowledge points are organized according to the degrees of advancement and complexity of the knowledge points and inter-relations among them. A predefined multilevel arrangement of knowledge points is typically designed (e.g., by experts) before the learning system can be used, and is stored in the system, but can be modified anytime. A predefined multilevel arrangement of knowledge of points may include one or a combination of various types of topologies such as a tree structure, a pyramidal structure, a star structure, a chain structure, a ring structure and a grid structure. The predefined multilevel arrangement defines inter-relations of the knowledge points. Furthermore, each knowledge point may be accompanied with indicative information of that knowledge point to define inter-relations of the knowledge points, such as progressive levels, preparatory relations and prerequisites, as described herein.

It is appreciated that the predefined multilevel arrangement of the learning system may contain multiple groups of knowledge points. The multiple groups may or may not be related to each other. The multiple groups of knowledge points may relate to each other to a larger group. For example, the learning system may have knowledge points for multiple subject matters to be studied, of which the knowledge points of each subject matter are grouped into separate groups according to their respective levels of difficulty. As a user has finished the knowledge points of a certain group, the learning system may suggest the student to move on to another group of knowledge points which are at a higher level. For example, the levels of difficulty may be identified as grades as in the traditional school curriculums. The knowledge points of a subject matter, such as math, are grouped into several grades. When the user has finished the group of knowledge points representing the first grade math, the learning system may suggest the user to study the group of knowledge points representing the second grade math.

Information set: an information set is a set of information associated with one or more knowledge points and may each include at least one information content which may be a knowledge content, an evaluation content, a solution content or a user information content (such as present information and learning history information).

Information content: an information content may be a knowledge content, an evaluation content, a solution content or a user information content (such as personal information and learning history information). Multiple information contents of different kinds may be included in an information set.

Learning system: a learning system as described herein includes multiple knowledge points (which are organized in a predefined multilevel arrangement), and information sets associated with the multiple knowledge points. The predefined multilevel arrangement of the multiple knowledge points may be adjusted. The information sets may each include an information content such as a knowledge content, an evaluation content and a solution content. The learning system receives a user input through a user terminal and provides feedback to the user. The user terminal interacts with the learning system but may or may not be a part of the learning system. A learning system may be implemented as a website (on a network server, for example) which can be accessed from a user terminal (such as a personal computer). Alternatively, learning system may be stored in the user terminal, and optionally updated periodically from a server through the Internet. The functions of a learning system can be implemented by software, hardware or a combination thereof.

Learning history: learning history is information of the user's learning process. Such information may include any information related to the users learning process, including knowledge points selected by the user to study in the past, a track of such selected knowledge points, the user's feedback to the selected knowledge points, and the speed of the user feedback (which are related to the times the user needed to answer each question, the times the user needed to complete the study of each knowledge point, and the total times the user needed to complete a certain subject or a set of related subjects). The user feedback may include not only the feedback itself (such as answers) but also statistical information of the user's studies, such as completion rate, and correct rate.

Study result: a study result is an evaluation of the results or effects of a user's study. A study result may be that of a particular knowledge point, or of a series of knowledge points. A study result may be that of a particular learning session or an accumulated result of a particular user within a certain period of time, such as a total study result accumulated from the beginning when the user started to use the learning system. The study result of a knowledge point is an evaluation by the learning system of how well the user has learned the knowledge point based on the user feedback to the evaluation content associated with the knowledge point. The evaluation may consider both the correctness of answers and the speed of the feedback. One exemplary form of a study result is a grade (such as unsatisfactory, satisfactory, good, and excellent). In some embodiments where the evaluation content of a knowledge point have test questions or exercise questions, the study result may be a quantified score or grade, such as a percentage score calculated based on correct answers.

User information: user information generally refers to information related to a user including personal information such as geographic location, age, gender, school grade level, and parent information (e.g., occupation, education, and age of parents).

FIG. 1 illustrates a webpage of an exemplary learning system in accordance with the present disclosure. The learning system any one of the learning systems (e.g., 600 and 800) illustrated herein. After a user logs into the learning system, a webpage 100 as shown in FIG. 1 is displayed to the user. The learning system has multiple knowledge points and their associated information sets stored in advance. Each information set includes knowledge content, evaluation content and corresponding solutions of the evaluation content. The knowledge points are organized in a predefined multilevel arrangement such as a tree structure, a pyramidal structure and a grid structure. The webpage 100 provides a user interface for the user to select a particular knowledge point for study and to use the evaluation content of that knowledge point to evaluate a study result.

In one embodiment, the predefined multilayer arrangement of the knowledge points may be navigated through using an interactive graphic user interface provided by the webpage 100. The first level knowledge points 110 are illustrated on the webpage 100. The first level knowledge points 110 shown in the example of FIG. 1 are that of an entry-level mathematical subject. Specifically, the first level knowledge points 110 include "Numbers", "Calculation", "Measure", "Word Problems", "Shapes", "Algebra" and "Statistics". The user may choose one of the first level knowledge points 110 as the present knowledge point to study. The user may also choose the next level knowledge point as the present knowledge point to study. The subsequent levels are manifested to the user as the user navigates through the multilayered structure. For example, the user selects one of the first level knowledge points 110 and further browses the next level knowledge points which are subtopics of the selected first level knowledge point.

Each selected knowledge point 110 is associated with an information set which include knowledge content (instruction materials) and evaluation content. Evaluation content in turn may include several different types such as exercises, tests, and assessments. These different content types of information in the information set associated with each knowledge point are selectable and accessible through content type tabs (links) 120. Upon selecting one of the first level knowledge points 110, the user may further select each content type by selecting a content type tab 120. There is no restriction on the order of such selection. The user may alternatively select a content type 120 first and then select a knowledge point 110 to study.

For example, as shown in FIG. 1, the present knowledge point selected is "Word Problems", while the selected content type is "Exercises". For this present knowledge point and the selected content type combination, the learning system displays an exercise question "8×4 is" to be answered by the user, and further "(the result of 8×4)+50 is" to be answered by the user. The displayed exercise questions are part of an information set associated with the present knowledge point.

Figure 1A:
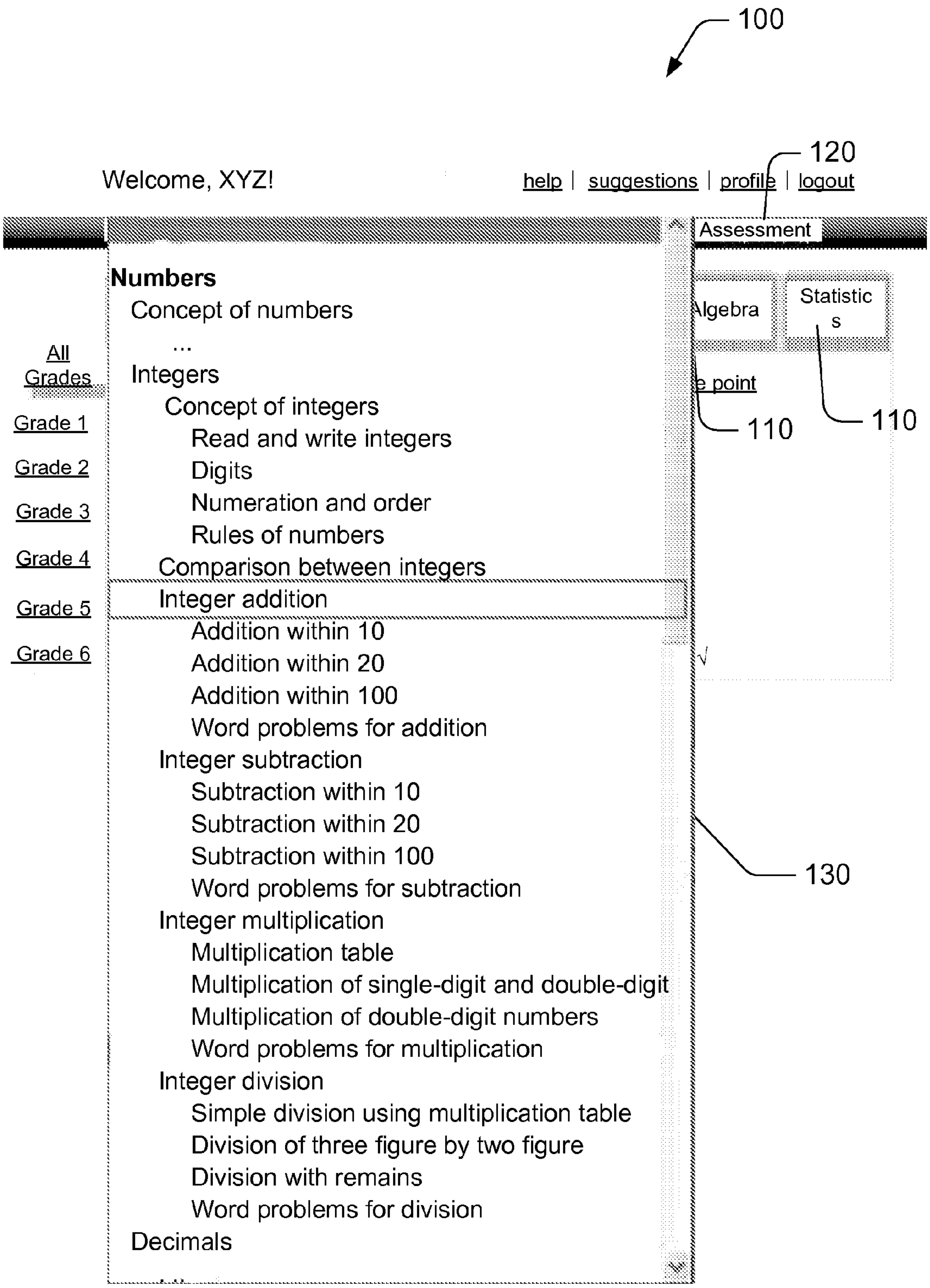
FIG. 1A illustrates an example of a pulldown menu superimposed over the webpage of FIG. 1.

The webpage 100 may be implemented using any available tools, including various hyperlinks and pull down menus. FIG. 1A illustrates an example of a pull down menu 130 superimposed over the webpage 100 of FIG. 1. The exemplary pull down menu 130 is a result of the user selecting "Numbers" on the webpage 100. FIG. 1A will be referred to later in the present description for further illustration of the process of selecting a present knowledge point.

Figure 2:
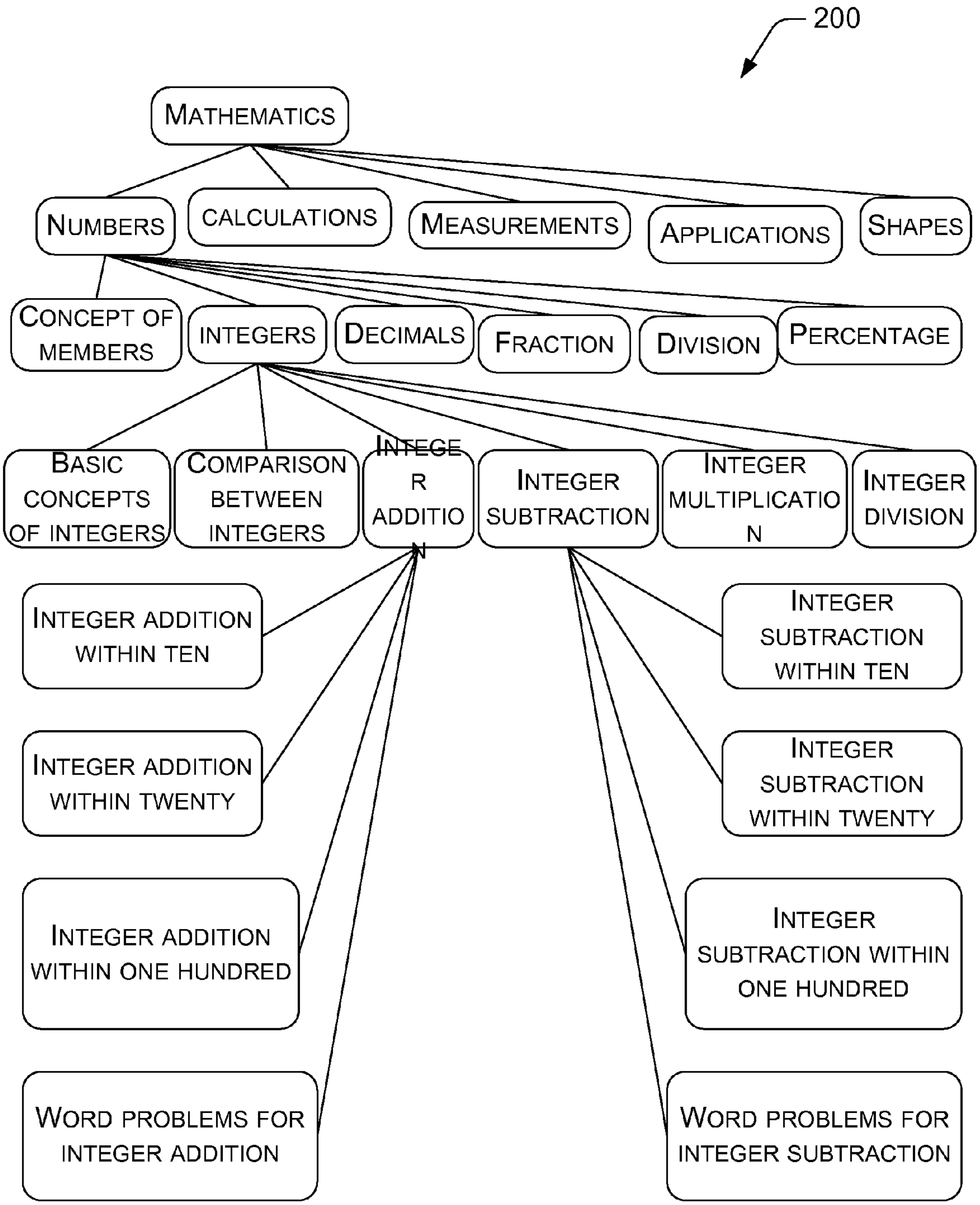
FIG. 2 illustrates an exemplary tree structure of knowledge points in Mathematics used in the learning system of the present disclosure.

FIG. 2 illustrates an exemplary tree structure of knowledge points in Mathematics in accordance with the learning system of the present disclosure. In the exemplary tree structure 200, the knowledge of Mathematics is differentiated (divided) through multiple levels to the most elemental level at which any further differentiation of the knowledge points would not have a cognitive significance, or no longer help the learning experience of the user. As shown in FIG. 2, the subject of Mathematics is first differentiated into first level knowledge points—"Numbers", "Calculations", "Measurements", "Applications" (or "Word Problems") and "Shapes". "Numbers" is selected to illustrate the differentiation of the next level. As strong, "Numbers" is then further differentiated into multiple second level knowledge points, such as "Concept of Numbers", "Integers", "Decimals", "Fractions", "Division", "Percentage" and "Ratio and Proportion". "Integers" is then selected to illustrate the differentiation (division) of the next level. As shown, "Integers" is differentiated into third level knowledge points such as "Basic Concept of Integers", "Comparison between Integers", "Integer Addition", "Integer Subtraction", "Integer Multiplication" and "Integer Division". Finally, "Integer Addition" and "Integer Subtraction" are selected to illustrate the lowest level differentiation. Specifically, "Integer Addition" can further be differentiated into fourth level knowledge points—"Addition of Integers within Ten", "Addition of Integers within Twenty", "Addition of Integers within One Hundred", "Word problems for Addition". Similarly, "Integer Subtraction" can further be differentiated into fourth level knowledge points—"Subtraction of Integers within Ten", "Subtraction of Integers within Twenty", "Subtraction of Integers within One Hundred", "Word Problems for Subtraction". In the example of FIG. 2, the fourth level knowledge points are the most elemental level knowledge points.

It is appreciated that the use of "first level knowledge point", "second level knowledge point" and so on has no special meaning other than for an illustrative purpose of describing the logical relationship between knowledge points.

The information set of each knowledge point includes knowledge content, evaluation content and solutions for evaluation content. For a non-elemental knowledge point (a knowledge point that has lower level knowledge points), its information set may contain a description of the knowledge point itself and a description of the low level knowledge points related thereto. Such descriptions may be separate descriptions of each knowledge point or a comprehensive description of all related knowledge points. The evaluation content of such a knowledge point may have a set of test questions each addressing a corresponding knowledge point or one or more complex test questions testing multiple related knowledge points within the same question.

Further illustration is given below using elemental knowledge point "Addition of Integers within Ten" as an example. The knowledge content of the knowledge point "Addition of Integers within Ten" may have:

1+1=2; 1+2=3; 1+3=4; 1+4=5; and so on, up to 8+1=9.

Examples of the evaluation content corresponding to the knowledge point "Addition of Integers within Ten" are:

Tj1: 1+3=( ); Tj2: 4+5=( ); Tj3: 3+( )=9; Tj4: ( )+6=8, where "( )" represents an answer needs to be supplied by the user.

For another example, the knowledge content of the knowledge point "Word Problems for Addition" may include one or multiple word problems (applied problems), such as:

"Ben has four candies and his brother has four candies. How many candies do they have together?" Formula: 4+4=8.

The corresponding evaluation content may include the following questions:

Tjw1: Ben wants to visit his grandmother and needs to take subway and bus. The fare for the subway is four dollars and that for bus is two dollars. How much does he need for this trip?

Tjw2: Ben wants to visit his grandmother and needs to take subway and bus. The fare for subway is four dollars and that for bus is two dollars. Ben has only five dollars. Does he have enough money to buy the fares? (A: Yes; B: No.)

Tjw3: Ben wants to visit his grandmother and needs to take subway and bus. The fare for subway is four dollars and that for bus is two dollars. Ben has only three dollars. How much more money does he need?

Tjw4: Ben wants to visit his grandmother and needs to take subway and bus. The fare for subway is four dollars and that for bus is two dollars. Ben has only four dollars. What should he do then? (A: Ask parent for one dollar; B: Ask parent for two dollars; C: Ask parent for three dollars; D: Nothing.)

Tjw5: Ben wants to visit his grandmother and needs to take subway and bus. The fare for subway is four dollars and that for bus is two dollars. Ben has only four dollars. What should he do then? (A: Ask parent for three dollar; B: Ask parent for two dollars; C: Ask for no money, but walk from the subway station to the grandma's.)

For a non-elemental knowledge point "Integer Addition", its corresponding knowledge content may contain information such as 1+4=5; 2+3+4=9; 6+7=13; 11+23+34=68; 17+8=25; 5+23=28; 35+62=97, etc., while its corresponding evaluation content may contain questions such as 2+3=( ); 13+9=( ); 67+5+18=( ); 25+21=( ); and 66+33=( ).

In the following, exemplary embodiments of the method using a computer-based learning system to provide user learning is illustrated with reference to several for charts, FIGS. 3-5. In this description, the order in which a process is described is not intended to be construed as a limitation, and any number of the described process blocks may be combined in any order to implement the method, or an alternate method.

Figure 3:
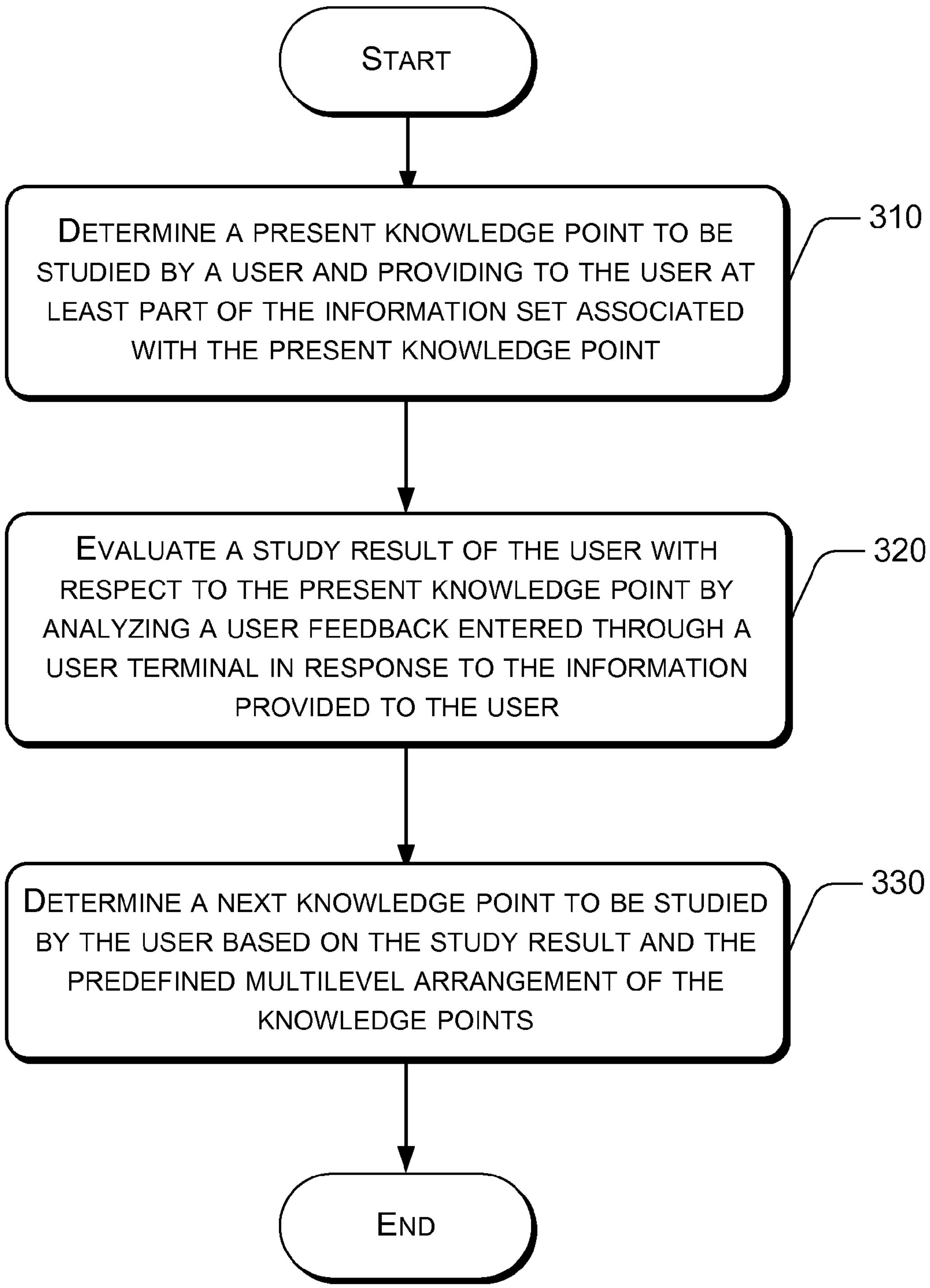
FIG. 3 is a flowchart of an exemplary method using the learning system to provide user learning in accordance with the present disclosure.

FIG. 3 is a flowchart of an exemplary method using the learning system to provide user learning in accordance with the present disclosure. This flowchart should be understood with reference to FIGS. 1 and 2.

At block 310, the learning system determines a present knowledge point to be studied by a user, and provides to the user at least one information content of the information set associated with the present knowledge point. This may be done through user interaction, or based on a recorded user history, or a combination of both. An example of determining the present knowledge point through user interaction will be illustrated later with reference to FIG. 4.

In one embodiment, the method determines the present knowledge point according to a user input from a user terminal, and sends at least one information content of the information set of the present knowledge point to the user. For example, suppose the user manifests an intention to study addition of integers within ten. The learning system finds the knowledge point "Addition of Integers within Ten" as shown in FIG. 2 and provides at least one information content of the information set of this knowledge point to the user. The part of the information set sent to the user may be an evaluation content, a knowledge content, a solution for the evaluation content, or a combination of several different contents. The actual content(s) of the information set sent to the user, and the order in which such content(s) are sent to the user, may be either prescribed by the learning system or determined by the learning system based on system requirements/preferences and user preferences. For example, in one exemplary environment, an evaluation content is first provided to the user, and selective knowledge content is provided to the user subsequently based on user feedback to the evaluation content. In another exemplary environment, a knowledge content is first provided to the user to study and evaluation content is provided subsequently, either automatically (e.g., after a preset length of time) or upon demand (e.g., upon receiving an instruction from the user through the user terminal).

In one embodiment, the present knowledge point is determined at least partially based on a recorded learning history of the user. The learning history may include at least some information of a previous learning knowledge point, a previous user feedback, and a previous study result with respect to the previous learning knowledge point.

At block 320, the learning system evaluates a study result of the user with respect to the present knowledge point by analyzing a user feedback entered through a user terminal in response to the information provided to the user. The evaluation may be done using the pre-stored solutions to check the answers included in the user feedback.

User feedback can be any relevant information collected by the learning system during the user response to the information associated with one or more knowledge points presented to the user by the learning system. Examples of such information include user answers to the questions, speed of response, and the level of completion. Based on the user feedback, the learning system evaluates the study result of the user. The study result may be a measure of the quality of the user response, measured in various terms such as scoring of the correct answers, the speed of the user feedback (which are related to the time the user needed to answer each question and the time the user needed to complete the study of the knowledge point), and the level of completion (e.g., what percentage of the work did the user complete). For example, if a user scores 80% correct answers in a relatively speedy manner, the study result of the user may be considered good. If another user scores the same 80% correct answers but at a much slower speed, the study result of that user may be considered merely satisfactory.

One exemplary way to implement measurement of response speed is to set one or more thresholds of time lengths according to the difficulty level of the material or question presented to the user. The learning system records the time that the user needed to answer the question and compares the time with the preset thresholds of time lengths to grade the speed of the user response.

At block 330, the learning system determines the next knowledge point to be studied by the user based on the study result of the user with respect to the present knowledge point and the predefined multilevel arrangement of the knowledge points. Further detail of determining the next knowledge point is described later in this description, after the process for determining the present knowledge point is first described below.

Determining Present Knowledge Point

For the purpose of clarity, the present description makes a distinction between the process of determining a present knowledge point to be studied and the process of determining a next knowledge point to be studied. However, it is noted that the next knowledge point to be studied, once selected, becomes a present knowledge point. Therefore, the methods for determining the next knowledge point may also be considered as alternative methods for determining the present knowledge point. In this respect, the determination of an initial present knowledge point to be studied is somewhat unique in practice. An initial present knowledge point is the first knowledge point to be studied by the user in the beginning of each learning session, e.g., in the beginning of a new logon, or in the beginning of a new learning session started while the user remains logged on.

At least two alternate methods and their combinations may be used for selecting a knowledge point to be studied.

Method I: The user selects a knowledge point to study using an interactive user interface, such as the webpage 100 of FIG. 1. Typically, in order to make a selection, the user enters a user input through a user terminal. The user input indicates a user selection of a knowledge point. The learning system receives the user input and makes the selection. The detail of this interactive selection process will be further described with reference to FIG. 4. The user may enter a selection with a variety of scenarios.

First scenario: the user manually makes a series of selections according to the structure of the knowledge points presented through the interactive user interface.

Second scenario: the user clicks a link to a knowledge point presented by the learning system. The linked knowledge point may be selected by the learning system based on the study results of the previous knowledge point.

Third scenario: the user inputs one or more keywords for a knowledge opponent to be selected. Instead of selecting among the knowledge points visually presented through the interactive user interface, the user enters a keyword to look up a relevant knowledge point to study. In order to assist the selection process, the learning system may provide hints, prompts or suggestions based on the current user status and using information. For example, as the user enters a part of the keyword, the learning system automatically displays complete names or titles of the knowledge points related to the part of the keyword that has already been entered to allow the user to make a quicker selection from the automatic suggestions made by the system. For example, as the user enters a keyword "integer", the learning system automatically displays the titles of knowledge points relevant to integers, such as "Basic Concepts of Integers", "Comparison between Integers", "Integer Addition", etc. as suggestions. The user may either select a knowledge point title among the suggestions or continue to enter the complete title of a desired knowledge point according to the suggested titles. The user then press the "enter" key (or through any other input means equivalent to the "enter" key) to indicate that a selection has been made. Upon receiving the title of the selected knowledge point, the learning system sends at least one information content of the information set associated with the selected knowledge point to the user.

Method II: in order to maintain the continuity of the study, the learning system may automatically decide the knowledge point to be studied and present it to the user when the user logs on to the learning system. The system may determine the knowledge point to be studied by the user based on the learning status of the user at the time of the last log off. For example, the knowledge point to be studied at user logon may be the same as the last knowledge point studied by the user during the previous logon, or it may be a next level knowledge point determined based on the last knowledge point studied by the user during the previous logon. One way to implement such continuity is to reload at the time of logon the last webpage the user viewed at the time of the last log off.

Figure 4:
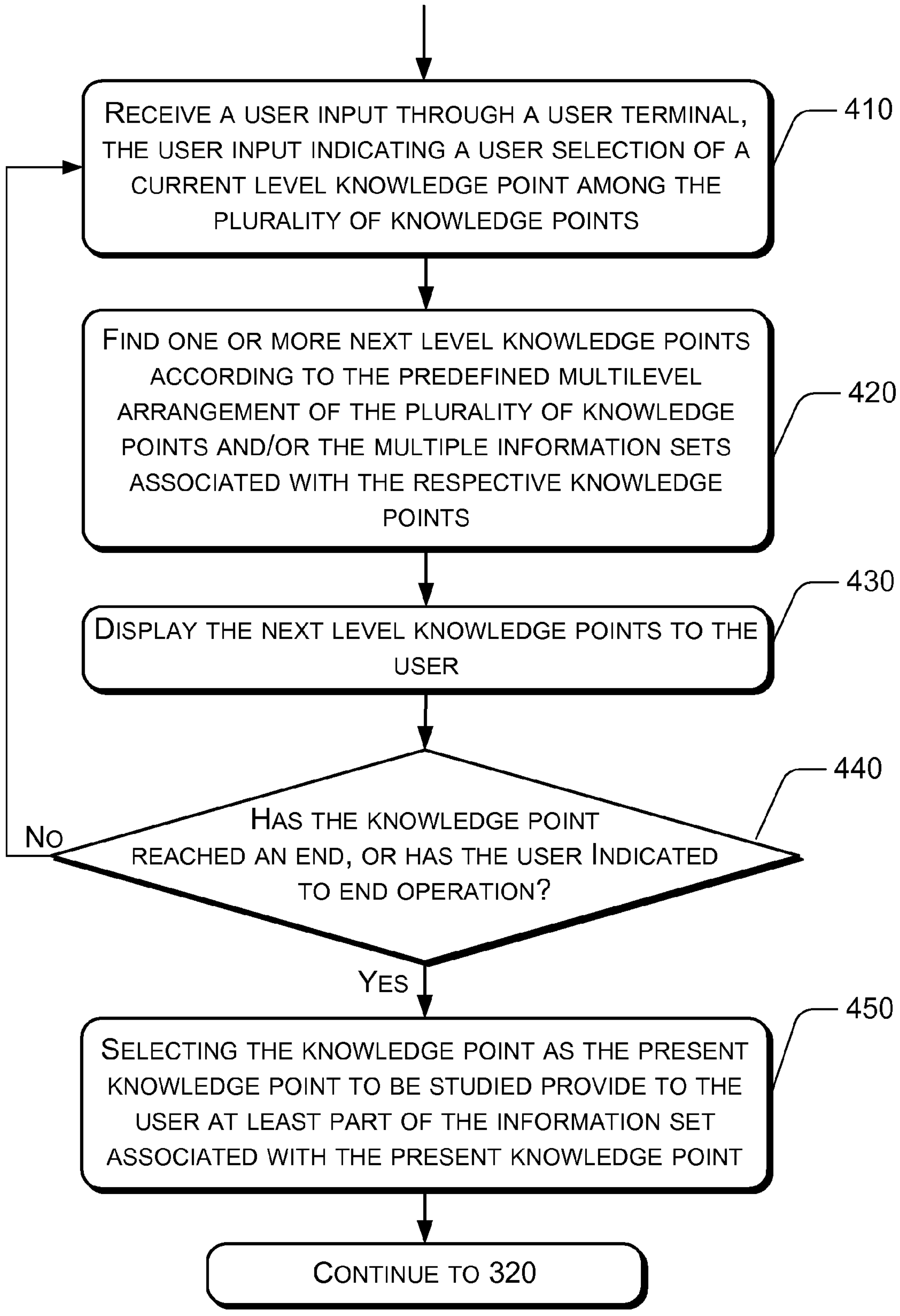
FIG. 4 is a flowchart of an exemplary process used for determining the present knowledge point based on a user interaction.

FIG. 4 is a flowchart of an exemplary process used for determining the present knowledge point based on a user interaction. In this embodiment, block 310 can be further divided into three sub-steps as illustrated in FIG. 4.

At block 410, the learning system receives a user input through a user terminal. The user input indicates a user selection of a current level knowledge point among the knowledge points manifested to the user. The user input may be any suitable type used for communicating a user selection. For example, the user input may be a mouse click on an active button representing a knowledge point, or a selection in a drop-down menu.

At block 420, the learning system finds one or more next level knowledge points according to the predefined multilevel arrangement of the knowledge points and/or the multiple information sets associated with the respective knowledge points. Typically, with a current user selection of a knowledge point, the next level knowledge points are well defined in the predefined multilevel arrangement of the knowledge points, as shown in the illustrative tree structure 200 of FIG. 2. However, for a given knowledge point, its associated information set may also indicate, define or recommend a next level knowledge points such that the learning system may be able to directly locate the next level knowledge points with reference to the information set associated with the given knowledge point.

At block 430, after finding knowledge points at the next level of the current user selected knowledge point, the learning system sends these knowledge points to the user terminal to be displayed to the user for further selection.

The above process (from 410 to 430) is iterated until a desired knowledge point is determined and the information of the desired knowledge point is found and sent to the user terminal. Alternatively, the process may terminate upon receiving a command to terminate the operation from the user through the user terminal.

Specifically, at block 440, the learning system determines whether the knowledge point has reached an end of the predefined multilevel arrangement (i.e., no further next level knowledge point is identified), or a user has indicated to end operation has been received. If none of the two conditions is met, the process returns to block 410 to iterate blocks 410-430, until one of the two conditions is met.

The above interactive process between the learning system and user may be further illustrated using an example from FIG. 2. For example, when a user wants to study "Addition of Integers within One Hundred", the user first chooses knowledge point "Numbers" out of multiple first level knowledge points (namely "Numbers", "Calculations", "Measurements", "Applications" (or "Word Problems"), "Shapes" and others that are not shown) through a user interface illustrated in FIG. 1. The user terminal sends this selection command to the learning system. Upon receiving the selection command, the learning system looks up the knowledge points at next level of the knowledge point "Numbers" according to the predefined multilevel arrangement of multiple knowledge points. As shown in FIG. 2, the knowledge points at the next level (in this case the second level) of "Numbers" are "Concept of Numbers", "Integers", "Decimals", "Fraction", "Division", "Percentage", and others that are not thrown such as "Ratio and Proportion". The learning system then sends these second level knowledge points to the user terminal for further selection by the user.

After the user terminal receives these second level knowledge points ("Concept of Numbers", "Integers", "Decimals", "Fraction", "Division", "Percentage", and "Ratio and Proportion") and displays them to the user, the user further selects the knowledge point "Integers" among them. The user terminal sends this selection command to the learning system. After receiving the selection command, the learning system looks up knowledge points at next level (third level in this example) of "Integers" according to the predefined multilevel arrangement of knowledge points in the subject of Mathematics. The corresponding third level knowledge points found are "Basic Concept of Integers", "Comparison between Integers", "Integer Addition", "Integer Subtraction", "Integer Multiplication" and "Integer Division". The learning system then sends these third level knowledge points to the user terminal for further selection of the user.

Upon receiving these third level knowledge points ("Basic Concept of Integers", Comparison between Integers", "Integer Addition", "Integer Subtraction", "Integer Multiplication" and "Integer Division"), the user selects the knowledge point "Integer Addition" among them, and thereupon the user terminal transmits this selection command to the learning system. After receiving this selection command, the learning system looks up knowledge points at next level (fourth level) of the knowledge point "Integer Addition" according to the predefined multilevel arrangement of knowledge points. As shown in FIG. 2, the corresponding fourth level knowledge points are "Addition of Integers within Ten", "Addition of Integers within Twenty", "Addition of Integers within One Hundred", and "Word problems for Addition". The learning system will then send these fourth level knowledge points to the user terminal for further selection of the user.

After receiving these fourth level knowledge points ("Addition of Integers within Ten", "Addition of Integers within Twenty", "Integer Addition within Hundred", and "Word problems for Addition"), the user terminal displays these knowledge points to the user, who then selects, for example, the knowledge point "Addition of Integers within One Hundred". The user terminal transmits this selection signal to the learning system. Upon receiving this selection signal, the learning system again attempts to look up knowledge points at next level of this knowledge point ("Addition of Integers within One Hundred") according to the arrangement structure of knowledge points, but will find no lower level knowledge point from this point further. As a result, "Addition of Integers within One Hundred" is determined to be the present knowledge point to be studied by the user. The learning system thus obtains at least one information content of the information set of the knowledge point "Addition of Integers within One Hundred" and sends it to the user terminal.

The above process may be implemented using a webpage interface with pulldown menus as shown in FIG. 1 and FIG. 1A, which illustrate an implementation of the exemplary tree structure of knowledge points in Mathematics of FIG. 2 using a webpage and pull down menu. The exemplary pull down menu 130 as shown is displayed when the user selects "Numbers" on the webpage 100. It is appreciated that a webpage and pulldown menus can be implemented in a variety of ways, as known in the art. The pulldown menu 130 may provide all at once a complete list of knowledge points related to the top-level knowledge point ("Numbers" as illustrated) selected by the user. Alternatively, the pulldown menu may be graduated to show various levels as the user makes selections through the structured list of the knowledge points. The user selection may be indicated by a variety of ways such as keyboard input and mouse input. The mouse input may either be a click of a button or mouse hovering over.

After receiving the information of the knowledge point "Addition of Integers within One Hundred", the user terminal displays the received information to the user. In a typical study session, the received information may include a knowledge content and/or an evaluation content. The user can now study the knowledge content in the information provided, do the exercises in the evaluation content associated with the present knowledge point, and provide answers to the questions or quizzes in the evaluation content as a user feedback. After the user has completed the work, the user terminal sends the user's answers to the learning system. Upon receiving the user's answers, the learning system analyzes these answers based on the pre-stored solutions for the evaluation content in order to evaluate the study result of the user with respect to the present knowledge point (in this example, "Addition of Integers within One Hundred").

It is noted that the exemplary interactive process (presented by block 310) between user and learning system described in detail with reference to FIG. 2 and FIG. 4 above is only illustrative. Many possible variations may exist to accomplish the process. For example, alternatively, the learning system may send information of multiple knowledge points at multiple levels to the user together to reduce the number of interactions between user and learning system. For instance, after the user chooses the first knowledge point "Numbers", the learning system may consider "Numbers" as a root node and sends the information of all intermediate nodes and leaf nodes, as well as their inter-relations, to the user together. Such sent information may be presented to the user with a textual description or a graphical user interface. For example, when the user selects "Numbers", a tree structure of all knowledge points related to "Numbers" may be presented to the user together without going through a level by level expansion. The user can then directly select a particular knowledge point for study.

Determining Next Knowledge Point

The process (as represented by block 330 of FIG. 3) of determining the next knowledge point to be studied by the user is described in further details below.

After analyzing the user's answers to evaluate the study result of the user with respect to the present knowledge point, the learning system determines next knowledge point to be studied by the user based on the evaluation of the user's study result. One possible way to evaluate the study result is a straightforward score scheme based on the percentage of correct answers provided by the user with respect to the evaluation content received by the user. Other methods such as weighted scoring may also be used.

With an evaluation score of the study result, the learning system determines whether the study result in the knowledge point meets certain criteria. For example, the learning system may determine if the score of the evaluation reaches or is higher than a first preset threshold. If yes, the study result is considered to have satisfied or surpassed a preset standard.

Using the above example for illustration, the learning system determines whether the score of the study result for the present knowledge point "Addition of Integers within One Hundred" is higher than a first preset threshold. If the study result meets or surpasses the first preset threshold, the next knowledge point to be studied by the user may be "Word problems for Addition", which is considered a progressive knowledge point with respect to the current knowledge "Addition of Integers within One Hundred" according to the predefined multilevel arrangement of the knowledge points. In this description, a progressive knowledge point is usually either parallel to the present knowledge point at the same level or advancing from the present knowledge point to a higher level. The predefined multilevel arrangement of the knowledge points and/or the information sets of the knowledge points may further define the specific next knowledge point(s) for each knowledge point.

If the study result is at or below than a second preset threshold, the next knowledge point to be studied by the user may be a supporting knowledge point, which may usually be either the same as the present knowledge point or supplemental to the present knowledge point at the same or a lower level. In the illustrated situation, for example, the next knowledge point may still be the present knowledge point "Addition of Integers within One Hundred" to give the user an opportunity to make further progress on the same knowledge point.

By way of illustration, assume the first preset threshold is 60%, and the user has got ten correct answers out of ten. In this case, the study result of the user in the knowledge point "Addition of Integers within One Hundred" has a very high score. The learning system may suggest that the next knowledge point be "Word Problems for Addition" as shown in FIG. 2, and may accordingly provide the user a link to this knowledge point. As another illustration, assume the second preset threshold is 50%. If the user only gives four correct answers out of ten, the study result of the user for this present knowledge point is not adequate and the learning system may suggest that the user study the same knowledge point ("Addition of Integers within One Hundred") again.

The next knowledge point may also be a lower level knowledge point such as "Addition Within 20" or even "Addition with 10", if the learning system decides that the user needs some make-up study before making further progress. In this case, the learning system continues to monitor the user performance. If the user shows immediate high proficiency on the newly assigned support knowledge point(s), the system may decide to user's problem lies somewhere else and thus identify a different support knowledge point. If the user shows initial weakness but starts to show satisfactory proficiency on the newly assigned support knowledge point(s) after a certain amount of practice, the system may decide that the user has had enough make-up study and is ready to go back to the previous level study.

In this description, the preset thresholds referred to as the first threshold, the second preset threshold and the third preset threshold may be the same or different. The specific values for these thresholds may depend on the evaluation contents in the learning system. For example, the second preset threshold may or may not be the same as the first preset threshold. The second preset threshold may be lower than the first preset threshold, leaving a gap therebetween for other type of decisions. Furthermore, multiple thresholds may be used to define a more refined scheme for recommending the next knowledge points. For example, a present knowledge point may have several progressive knowledge points, and the selection thereof may be based on the relative scoring (e.g., a higher score leads to a next knowledge point that is more complex or more advanced).

In some embodiments, the learning system further determines a preparatory knowledge point of the present knowledge point, and directs the user to the preparatory knowledge point. To determine the preparatory knowledge point, the learning system may look up a preparatory knowledge point indication attached to the present knowledge point. The indication of a preparatory knowledge point may simply be an identifier (e.g., a mark, a link, a textual description or a logo) of the preparatory knowledge points. The indication may be an internal identifier when the information set is stored in the learning system, but manifested as a visible identifier when displayed to the user.

For example, the knowledge point "Addition of Integer within Twenty" may be a preparatory knowledge point for "Addition of Integers within One Hundred". The knowledge point "Addition of Integer within Ten" may be another preparatory knowledge point for "Addition of Integers within One Hundred". Preferably, the information set of each knowledge point includes an indication of preparatory knowledge points corresponding to that knowledge point.

The learning system may decide whether to recommend a preparatory knowledge point and which preparatory knowledge point is to be recommended based on evaluating the study result of the user with respect to the present knowledge point. For example, if the learning system determines that the study result of the user with respect to the knowledge point "Addition of Integers within One Hundred" has a score lower than a third preset threshold, the learning system may suggest one or multiple preparatory knowledge points as the next knowledge point to be studied by the user.

In the example illustrated above, for example, assume the third preset threshold to be 30%. If the user can only give two correct answers out of ten, it is possible that the user has not truly grasped the related preparatory knowledge point "Addition of Integer within Twenty" and even "Addition of Integer within Ten". In this case, the learning system may suggest the user to review "Addition of Integer within Twenty" and possibly "Addition of Integer within Ten" as well.

It is noted that the phrases "present knowledge point", "supporting knowledge point", "preparatory knowledge point", and "next knowledge point" are to be understood in the context of a process, and are not meant to be mutually exclusive classifications of different types of knowledge points. In the process illustrated above, for example, a supporting knowledge point or a preparatory knowledge point selected by the learning system is the next knowledge point to be studied. Once the user is at the supporting knowledge point or the preparatory knowledge point, that knowledge point becomes the present knowledge point to be studied.

The above description describes the situation where the indication of preparatory knowledge points is included in the predefined multilevel arrangement of the knowledge points (for example included in the information sets associate with the knowledge points). The indication of the preparatory knowledge point for each knowledge point can also be derived from the evaluation content, combinedly, additionally or alternatively. For example, a knowledge point "rectangular solid shapes (cuboids)" may have lower-level knowledge points "surface area of cuboids" and "volume of cuboids". Assume the present knowledge point being studied is "surface area of cuboids", and the user does not show a solid grasp of this present knowledge point (e.g., answered only 6 of the 10 questions correctly). The learning system may identify through analyzing the user feedback that the user's weakness lies in the performing multiplications rather than a lack of understanding of the concept of the surface area. Correspondingly, before directing the user to study "volume of cuboids", the learning system may first direct the user to the knowledge point "multiplications" to study it as a preparatory knowledge point.

In embodiments where an indication of a preparatory knowledge point is included in the predefined multilevel arrangement of the knowledge points, the learning system may either select the indicated preparatory knowledge point. If multiple preparatory knowledge points are indicated, the learning system may select one preparatory knowledge point from the multiple indicated preparatory knowledge based on user feedback, or select using other available information (or even randomly).

For example, assume the user has logged on and selected a knowledge point "surface areas of cuboids" to study. The learning system first determines that the knowledge point "surface areas of cuboids" has knowledge point "multiplication" and respective lower-level knowledge points as preparatory knowledge points. The system checks the record of user data to determine whether the user has studied these preparatory knowledge points satisfactorily. If not, the learning system provides to the user the preparatory knowledge point "multiplication" and its associated information set including evaluation content to be studied by the user. Alternatively, the learning system may provide all or some of the information set of the knowledge point "surface areas of cuboids" and let the user choose an appropriate preparatory knowledge point. The information set may include information indicating all required or recommended preparatory knowledge points to allow the user to browse through the preparatory knowledge points in preparation of the study of the knowledge point "surface areas of cuboids".

The preparatory knowledge points may also be introduced in the middle of a study session while the user is studying the contents provided for the present knowledge point. For example, upon selecting "surface areas of cuboids" as the knowledge point to study, if the user has difficulties in a part of the contents (e.g., a test question), the user may decide (with or without the help of the learning system) that it is helpful to first study a preparatory knowledge point "multiplication". The user may go to the knowledge point "multiplication" following a link provided through the user interface which is based on the predefined multilevel arrangement of the knowledge points.

In one embodiment, the evaluation content provided to the user may contain multiple test points for testing multiple knowledge points including the present knowledge point and a preparatory knowledge point. When evaluating the study result of the user, the learning system may evaluate the multiple test points to determine the preparatory knowledge point.

For instance, in combined arithmetic of integers within one hundred, the evaluation content may include the following five quiz questions:

SZ1: 12+23=( );

SZ2: 45−31=( );

SZ3: 3×15=( );

SZ4: 20÷5=( );

SZ5: 36+8×13÷4−28=( ).

If the user answers the above fifth question incorrectly, the learning system can determine why the user has answered this question incorrectly by checking the accuracy of the answers to be previous four questions. For instance, if the user answers above questions SZ1, SZ2 and SZ3 correctly but not SZ4 and SZ5, it may suggest that the user have not fully grasped the division of integers within one hundred. In that case, the learning system may suggest the user to review the division of integers within one hundred as a preparatory knowledge point. For another example, if the user only answers the above questions SZ1, SZ2 and SZ4 correctly, it may imply that the user has not fully grasped multiplication of integers within one hundred. The learning system may suggest the user to review multiplication of integers within one hundred. However, if the user answers all but SZ5 correctly, this implies that the user may either have not grasped the combined arithmetic well enough, or has just not been careful. The learning system may therefore suggest the user to review the knowledge point of combined arithmetic. If the user answer all questions incorrectly, the user may need to review all preparatory knowledge points, so the learning system may advise the user to review all of the related preparatory knowledge points—"Addition of Integers within One Hundred", "Integer Subtraction within One Hundred", "Multiplication of Integers within One Hundred" and "Division of Integers within One Hundred".

In practice, a preparatory knowledge point may be suggested as an explicit preparatory knowledge point which needs to be studied before the user can study the next knowledge point. The preparatory knowledge point may be simply suggested as the next knowledge point to be studied (with or without indicating to the user whether this is a regular next knowledge point or only a preparatory knowledge point of another knowledge point to be studied after). The preparatory knowledge point may also be suggested as a going-back-to knowledge point before the user may come back to the present knowledge point to study it.

If the present knowledge point is the last one for a certain subject matter which the user needs to study, there would be no next knowledge point to be studied in the subject matter. In this case, the learning system may notify the user for a successful completion of the subject matter and provide suggestions for the next action, such as a review or study for a new subject matter. The learning system may provide a summary of the study results (such as an average score for all knowledge points studied) and detailed statistics of the study results to the user. A message of encouragement or complement may also be given to the user.

The above examples illustrate the process of how to determine a next knowledge point based on the study result of the user in the learning system. It is appreciated that the method in this disclosure is not confined to these examples. In practice, the methods of determining next knowledge point to be studied by the user may vary according to predefined multilevel arrangement of the knowledge points and their corresponding evaluation contents.

Individualized Information Content

As a variation to the process of FIG. 3, the information set associated with each knowledge point may have information contents in multiple versions representing various learning levels and/or teaching styles. The multiple versioned information content may be a knowledge content, an evaluation content or a solution content. The learning system determines which version of the information set is to be provided to the user based on the user feedback and other user preferences. For example, with several versions of information set each representing a different level of difficulties, the learning system determines which level of difficulty is to be provided to the user for the study of the present knowledge point and/or the next knowledge point. For example, the information set may have three different versions, namely advanced, medium, and basic. If the study result of the user for the present knowledge point is excellent, the level of difficulty for the next knowledge point may be determined as "advanced". Upon directing the user to the next knowledge point, the learning system provides the advanced version of the information set of the knowledge point. If the study result of the present knowledge point is good but not excellent, the level of difficulty for the next knowledge point may be determined as "medium", and so on. The design of the different versions and the selection thereof will depend on the specific requirements, policies and styles of the learning system and also user preferences. The selection of the level of difficulty may be made automatically by the learning system or left to the user to make. In particular, the level of the difficulty of the first knowledge point to be studied can be made by the user, randomly selected by the system, or determined by a preset user preference.

Knowledge Point Groups

In one embodiment, the learning system defines a group of knowledge points to be studied by a particular user based on the predefined multilevel arrangement of the knowledge points and a user input. The group of knowledge points may be a portion or all of the knowledge points in the predefined multilevel arrangement. This may further individualize the study by defining different groups of knowledge points to be studied by different users. For example, when a new user uses the learning system for the first time, the learning system may collect user information such as age, gender, school, grade, class, geographic location, and parental information such as occupation, age, and education of the parent(s) if the user is a young student. Using such information, the learning system may decide which group of knowledge points to start with for the new user. In addition, once logged on, the user may also choose a suitable grade (which corresponds to a certain group of knowledge points) to start with using, for example, the website user interface as shown in FIG. 1.

After the user has used the learning system for some time, the learning system will have accumulated a learning history of the user containing past study results and feedback speed information, and may use such history information to further define or adjust the group of knowledge points suited for the particular user's study.

For example, suppose the learning system has defined a group of knowledge points {A, B, C, D, E, . . . } for a user to study according to the user information, where A, B, C, . . . each represent a knowledge point or a group of knowledge points. As the user studies knowledge point B and as the learning system evaluates the user feedback to the evaluation contents of knowledge point B, the learning system may decide that the user still needs to study other related knowledge points B0 and B1, and add these knowledge points B0 and B1 into the group of knowledge points to be studied by the user.

To determine a group of knowledge points for a user, the learning system may also provide an initial test to the user and receive feedback from the user to the test questions. The learning system analyzes the received feedback and determines the level of knowledge of the user for the purpose of defining a group of knowledge points to be studied.

As described above, as the user learns multiple knowledge points, a process similar to that of FIG. 3 is followed for each knowledge point. The learning system may choose a customized initial group of knowledge points for the user to start. Even if two or more users may start with the same initial group of knowledge points, because each individual user may have different study results, the learning system may still choose different knowledge points for different users down the road, resulting in different learning courses of knowledge points for different users. The learning spirits is thus individualized or personalized.

Learning History

In one embodiment, the learning system records a learning history of the user. The learning history being recorded may include any information related to the study process of the user. For example, the learning history to be recorded may include at least some information of the present knowledge point, the user feedback, and the study result. The learning history may include the feedback speed of the user. The learning history may also include information sets of the knowledge points that have been selected by user and tracking courses of the selected knowledge points in the past. The learning history may include other information such as study notes of the user.

The learning system may determine the present knowledge point at least partially based on a previously recorded learning history of the user, which may include at least some information of a previous learning knowledge point, a previous user feedback, and a previous study result with respect to the previous learning knowledge point. Users may interactively utilize their learning history as illustrated below.

As users continue to use the learning system, the recorded learning history grows. The database containing the recorded learning histories of multiple users is thus a growing and dynamic system. As a user learns the knowledge points, the learning system also learns about the user and gains an increasing understanding of the user characteristics. The learning system may analyze the recorded learning history of the user to identify the user's weak points that need to be addressed and improved, and accordingly formulate individualized and adaptive learning course for the user. The individualization may not only be reflected by different tracks of knowledge points studied by different users, but also by different types (difficult levels and styles) of information provided to different users for a given knowledge point, as described herein.

The learning system may also use the recorded learning history to diagnose the user's status of understanding for each knowledge point. The following is an example for the purpose of illustration.

A knowledge point "area of rectangles" has a series of knowledge points related "multiplication" including preparatory knowledge points, a knowledge content including an introduction to how to calculate the area of a rectangle, and an evaluation content including the following test question:

A rectangle has a width of 3 m and length of 7 m. What's the area of this rectangle in square meters?

Suppose the user's answer to the above question received by the learning system is: "the area of the rectangle=20", which is an incorrect answer. Without any recorded learning history of the user, the learning system would find it difficult to determine the cause of this error, whether it is because the user does not know the correct formula to calculate the area of a rectangle, or because the user hasn't learned how to do multiplication of single figures well enough.

With recorded learning history of the user, however, the learning system may find that the user has already demonstrated a good commanding of the mortification of single figures, and thus decide it is more likely that the user hasn't learned the correct formula to calculate the area of a rectangle.

Not only can the learning system used the learning history for evaluation and diagnosis purposes, the user may also visit the recorded learning history for review or consulting purposes. Especially, the user may review the knowledge contents and evaluation contents previously studied, with a focus on those parts that the user has made mistakes or shown deficiencies, to improve the understanding and avoid making the same mistakes.

Figure 5:
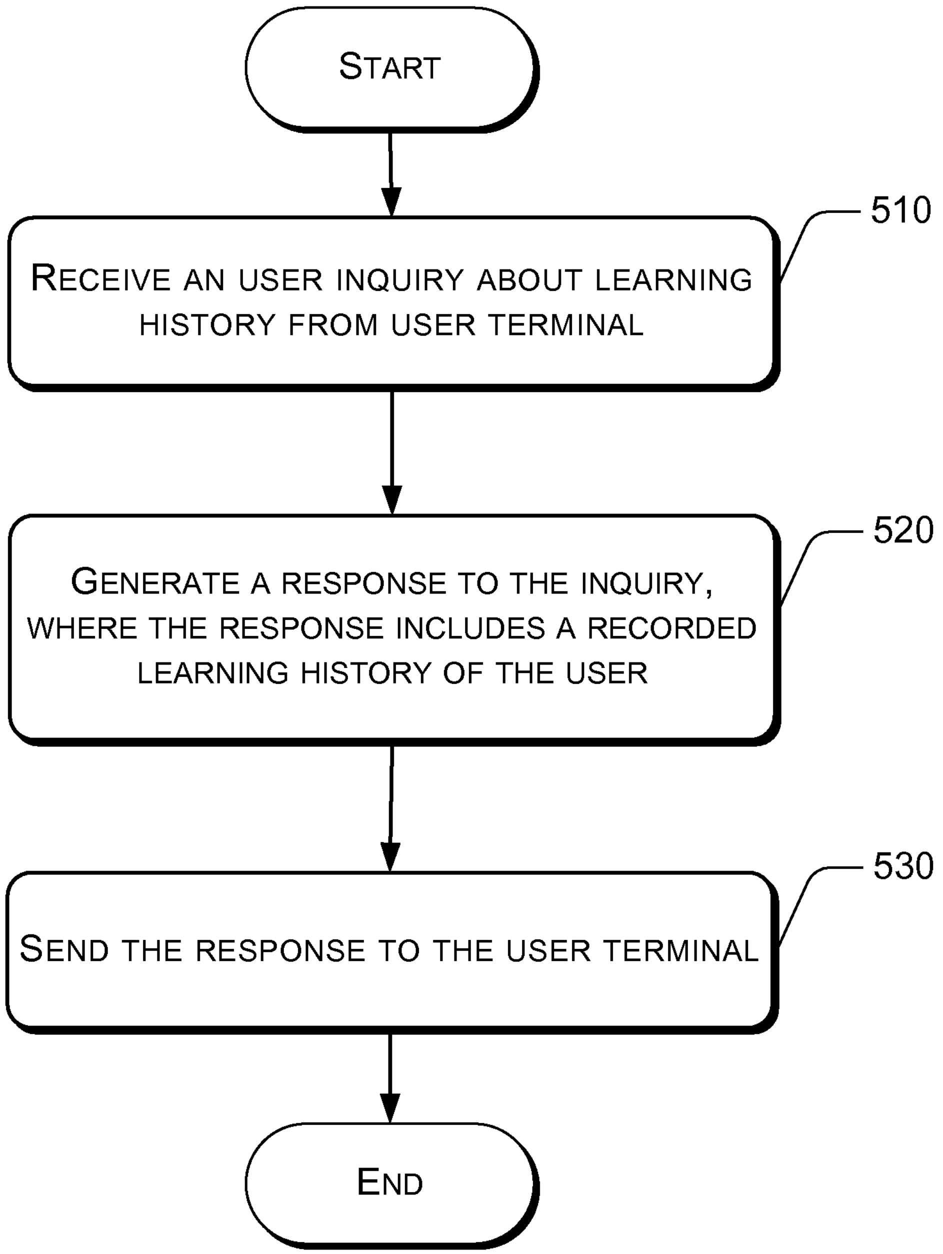
FIG. 5 is a flowchart of an exemplary interactive process in which a user uses a recorded learning history.

FIG. 5 is a flowchart of an exemplary interactive process in which a user uses a recorded learning history.

At block 510, the learning system receives an inquiry about learning history from the user through a user terminal. The inquiry received may include the subjects of the inquiry and a timeframe (a starting point and an ending point in time) of the learning history inquired. The inquiry may be for a specific knowledge point, a subject involving multiple knowledge points, or a search for studied knowledge points using a keyword. The inquiry may request knowledge contents of previously studied knowledge points and evaluation contents of previously studied knowledge points.

At block 520, the learning system generates a response to the inquiry. The response may include a recorded learning history of the user as specified by the inquiry.

At block 530, the learning system sends the response to the user terminal which in turn provides the information of the inquired learning history contained in the response to the user.

The response returned to the user may include the recorded information of user feedbacks (or links to such information) such as answers previously provided by the user when studied certain knowledge point(s). The response may selectively return only the part of the feedback that contains mistakes made by the user.

Preferably, the learning system may create a database of user profiles and user data and record the learning history of each user using the learning system. When a user logs onto the learning system, the learning system can either display a fixed webpage to the user as an entry or display the last visited webpage according to the user's learning history. This may improve the user experience and enhance individualization of the learning.

Preferably, the learning history can also include user feedback to the evaluation content (e.g., user's answers to the questions in evaluation content) and study results of the user, and allows a user to review past studies and submit inquiries of the past studies at any time. Through reviewing the knowledge contents and evaluation contents the user has studied, the user may have a stronger retention of what has been learned. Reviews may also make deeper impression of the lessons learned through incorrectly answered questions to help the user avoid making the same mistakes.

According to one aspect of the present disclosure, in order to improve user interaction, the learning system in some embodiments also receives user contents relevant to the knowledge points. The user contents may be recorded either separately or as part of the learning history information. In this description, "user content" refers to content provided by users of the learning system, and may include knowledge content, evaluation content, solution content and other user-generated information such as study experiences and tips. Users can send a user content through user interaction methods or channels used for regular study sessions.

The learning system may store the user content in association with one or more related knowledge points (e.g., store the user content as part of the information set of a related knowledge point), and use it as an alternative version of the information set in addition to the system-provided version of the information set. The user content may be provided to the same user for his own study of the related knowledge point(s), but may also be made available to other users when studying the related knowledge point(s). In one embodiment, for example, the learning system receives a user-provided knowledge content associated with one or more of the knowledge points, and stores the user-provided knowledge content along with a system-provided knowledge content associated with the respective knowledge points. The user-provided knowledge content may be used as an alternative to the system-provided knowledge content. The same can be done for a user-provided evaluation content. When a user studies the knowledge content and the evaluation content in the learning system, the learning system can give a notice to the user that there are other versions of knowledge content or evaluation content for user selection.

With multiple versions of knowledge content or evaluation content associated with a knowledge point, the learning system may further use user feedbacks to rank the different versions. In one embodiment, for example, the learning system receives user feedbacks on the multiple versions of the knowledge content, ranks the multiple versions of the knowledge content based on the user feedbacks, and subsequently provides a highly ranked version of the knowledge content to the user. The ranking criteria may include various factors such as clarity, thoroughness, relevance and style.

Inclusion of user content may help grade a more dynamic learning system that takes more advantage of the Web 2.0 functionalities. With respect to the knowledge content of a knowledge point, some users may have a better description of the knowledge point, or at least an alternative version (although not necessarily a better one). Likewise, with respect to the evaluation content of a knowledge point, users may provide a better set of evaluation content. These user-provided contents, even if not as professionally written as the system-provided contents, may sometimes prove to be more helpful to the peers because they may be written from a student point of view. The user provided contents may also fill in blanks in some of the rare knowledge points for which the system has not provided an adequate information set. In addition, allowing the user to provide their own content creates a space of self-expression and may greatly enhance the enthusiasm of the users.

In one embodiment, the learning system may provide knowledge content and/or solutions of an evaluation content to the user, if the learning system deems necessary or helpful to do so. The learning system may determine whether to provide the knowledge content or the solutions of the evaluation content of the present knowledge point to the user based on the user feedback to the evaluation content. For example, after providing the evaluation content of the knowledge point "Addition of Integers within One Hundred" to the user, the learning system may provide the knowledge content of this knowledge point to the user if no feedback is received within a preset time interval. Likewise, upon receiving the user feedback to the evaluation content (e.g., user's answer for the evaluation content), the learning system may also send the corresponding solutions of this evaluation content to the user. This may be done according to a user preference or according to the user's study results (e.g., the answers of the user may indicate that the user need the solutions of the evaluation content to compete the learning process of the present knowledge point). Before sending the knowledge content or pre-stored solutions to the user, the learning system may also ask the user if knowledge content or pre-stored solutions are needed.

It is appreciated that the above described exemplary processes may be carried out separately or in any combination.

Exemplary Implementation of Learning System

Another aspect of the present disclosure is a computer-based learning system used for implementing the above described method for providing user learning. The computer-based learning system is used to carry out the learning processes described in this disclosure. Exemplary embodiments of the computer-based learning system in accordance with the present disclosure are described below. It is appreciated that the performance of a certain function (or step) in a learning process described in this disclosure is not limited to a particular component, unit or device as illustrated below.

Figure 6:
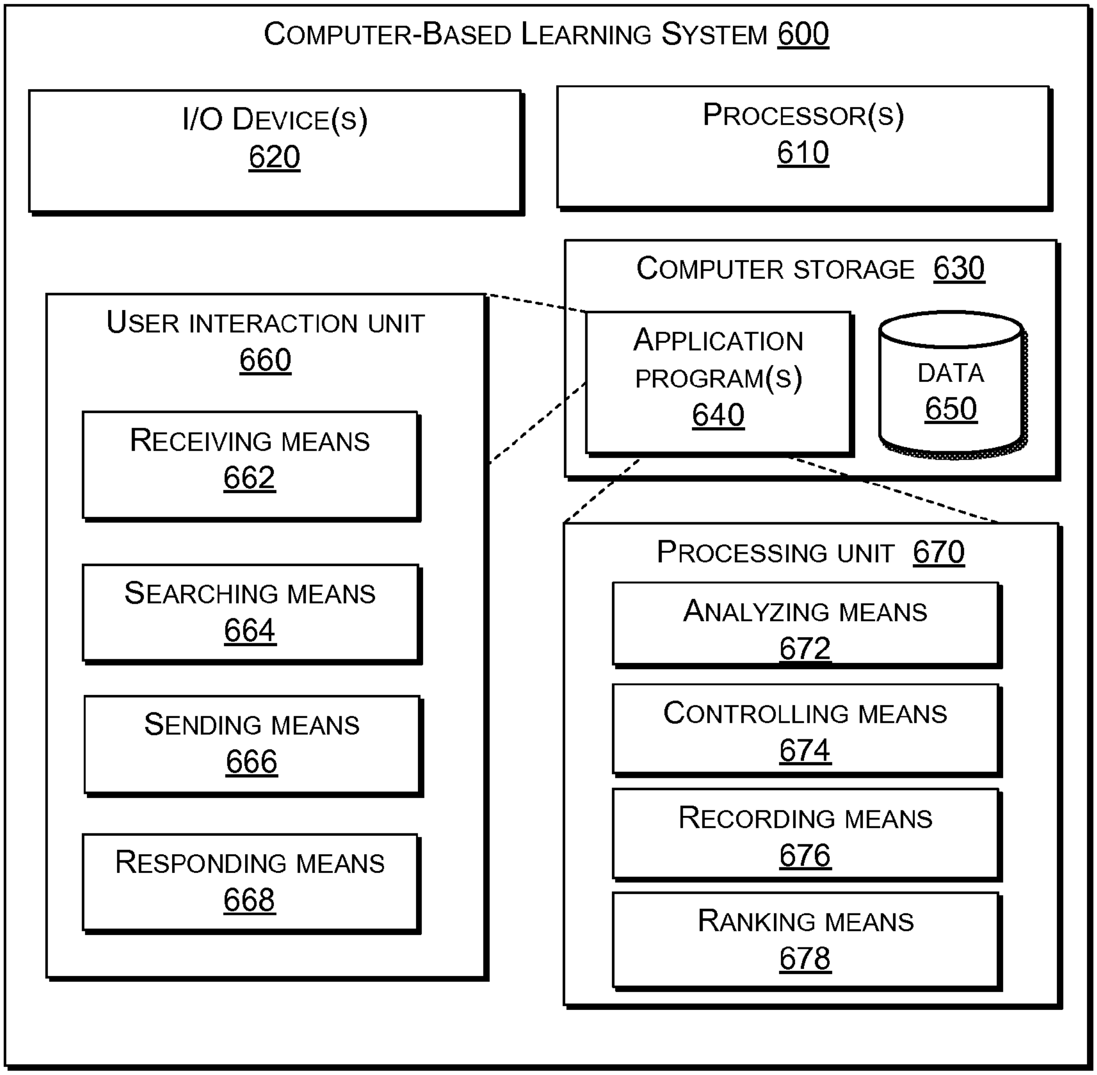
FIG. 6 is a block illustration an exemplary computer-based learning system in accordance with the present disclosure.

FIG. 6 is a block illustration an exemplary computer-based learning system in accordance with the present disclosure. Computer-based learning system 600 includes basic components of a computing device such as processor(s) 610, I/O devices 620 (which may include a network interface), and computer storage 630. Computer-based learning system 600 also has other components such as user interaction unit 660 and processing unit 670. The user interaction unit 660 includes a receiving means 662, a searching means 664, a sending means 646 and a responding means 668, the functions of which means are described later in the present description. Processing unit 670 includes an analyzing means 672, a controlling means 674, a recording means 676 and a ranking means 678. The functions of these means are described later in the present description.

The computer storage 630 stores application program modules 640 and data 650. Data 650 may include databases containing knowledge points organized with a predefined multilevel arrangement and the associated information sets. Each information set having one or more of a knowledge content, an evaluation content and a solution content. Data 650 may also include user information and study results.

It is appreciated that the computer storage 630 may be any form of computer readable media, or suitable memory devices for storing computer data. Such memory devices include, but not limited to, hard disks, flash memory devices, optical data storages, and floppy disks. Furthermore, the computer readable media (e.g., computer storage 630) containing the computer-executable instructions may consist of component(s) in a local system or components distributed over a network of multiple remote systems. The data of the computer-executable instructions may either be delivered in a tangible physical memory device or transmitted electronically.

Application program modules 640 contain instructions which, when executed by processor(s) 610, cause the processor(s) 610 to perform actions of a process described herein (e.g., the processes of FIGS. 3-5).

For example, in one embodiment, computer storage 630 has stored thereupon a plurality of instructions that, when executed by one or more processors 610, causes the processor(s) 610 to perform the following actions:

(a) determining a present knowledge point to be studied by a user and providing to the user at least one information content of the information set associated with the present knowledge point;

(b) evaluating a study result of the user with respect to the present knowledge point by analyzing a user feedback entered through a user terminal in response to the information content provided to the user; and (c) determining a next knowledge point to be studied by the user based on the study result and the predefined multilevel arrangement of the knowledge points.

Figure 7:
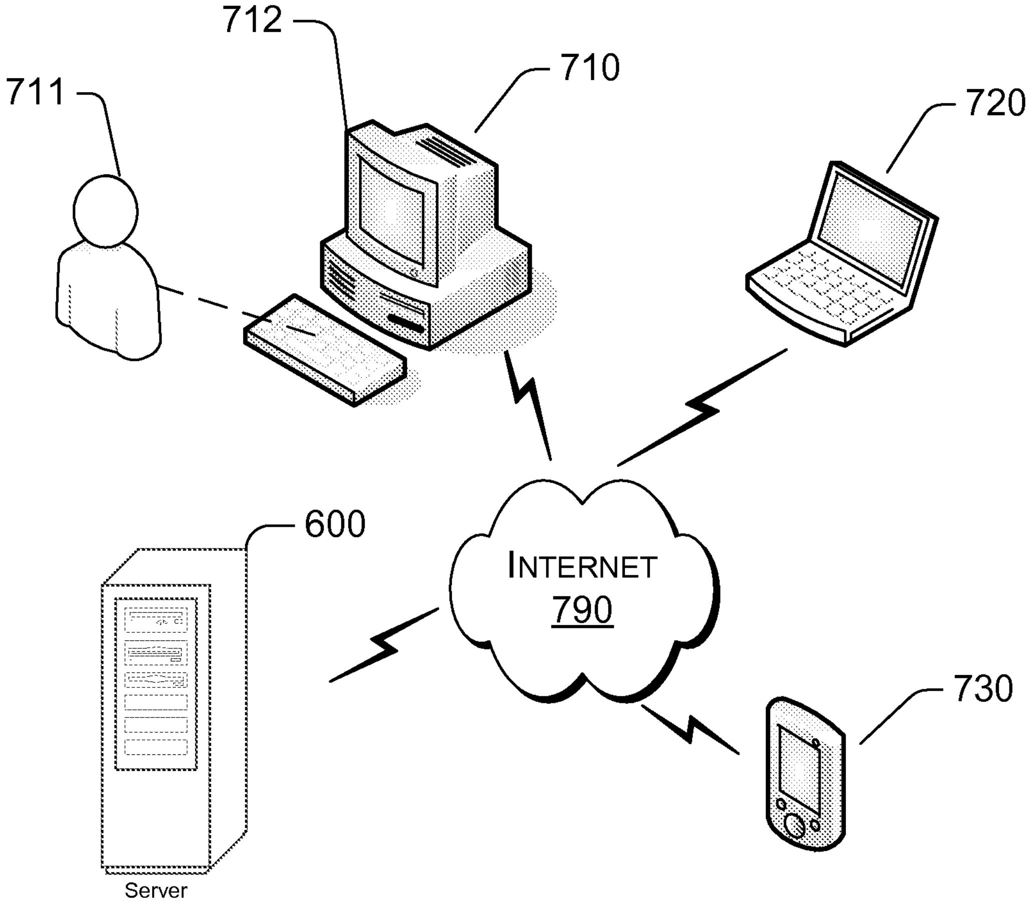
FIG. 7 illustrates an exemplary implementation environment of the learning system in accordance with the present invention.

FIG. 7 illustrates an exemplary implementation environment of the learning system in accordance with the present invention. In the exemplary embodiment, the learning system 600 is implemented on Internet 790. The learning system 600 is implemented as a server computer or a cluster of server computers. The learning system 600 is connected to client computing devices 710, 720 and 730 through networks 790. Each client computing device 710, 720 and 730 may also have its own processor, I/O devices and computer readable media. However, client computing devices 710, 720 and 730 are generally not considered part of the learning system 600 in this exemplary implementation.

In practice, user 711 logs on to learning system 600 through respective client computing device 710 (or any other client computing device 720 or 730), starts a learning session by selecting a pursuant knowledge point (such as one the user is interested or one that is recommended or selected by learning system 600). Users may be managed using individual user accounts which require a username and password to log on.

In the learning session, the user receives evaluation content associated with the selected knowledge point and provides feedback to learning system 600, which in turn evaluates study result of the user based on the received feedback and determines the next knowledge point according to the predetermined multilevel arrangement of knowledge points and the study result of the user.

Using the Internet-based configuration of FIG. 7, the learning system may be implemented as a website (on a network server, for example) which can be accessed from a user terminal (e.g., any of the client computing devices 710, 720 and 730). The configuration of the system is not limited to the particular topology illustrated in FIG. 7. In addition, instead of being hosted on a server, the learning system 600 may be installed in client computing devices (such as personal computers 711 and 720 and even portable devices 730), and optionally updated periodically from a server through the Internet. The functions of a learning system can be implemented by software, hardware or a combination thereof.

Preferring back to FIG. 6, in order to perform the above actions, computer-based learning system 600 further has user interaction unit 660 adapted to interact with a user (e.g., 711) through a user terminal (e.g., 712), determine a present knowledge point to be studied by the user, and provide to the user through the user terminal at least part of an information set associated with the present knowledge point.

It is appreciated that the user interaction unit 660 (including receiving means 642, searching means 644, sending means 646 and responding means 668), and the processing unit 670 (including analyzing means 672, controlling means 674, recording means 676 and ranking means 678) may be embodied in any suitable computational components including hardware components and software modules that are able to accomplish the above described receiving, searching, sending, responding, analyzing, controlling, recording and ranking functions. In particular, the software portions of the user interaction unit 660 and the processing unit 670 may be part of the application program(s) 640 stored in computer storage 630.

In one embodiment, receiving means 662 is used for receiving from the user terminal a user input indicating user selection of a current level knowledge point among the plurality of knowledge points; searching means 664 is used for finding one or more next level knowledge points according to the predefined multilevel arrangement of the knowledge points and/or multiple information sets associated with the respective knowledge points; and sending means 666 is for sending the next level knowledge points to the user terminal.

The user interaction unit 660 may be further adapted to receive from the user an inquiry about user learning history. The responding means 668 of the user interaction unit 660 in this embodiment can be used for generating a response to the inquiry. The response may include a recorded learning history of the user. The sending means 666 may be further adapted to send the response to the user through the user terminal.

Controlling means 660 may be used for controlling receiving means 642, searching means 644, sending means 646 and responding means 668 to perform respective functions. For example, in one embodiment, controlling means 660 controls receiving means 642, searching means 644, sending means 646 to perform their respective operations until the present knowledge point is determined or until receiving a user indication to end operation.

The user interaction unit 660 may be further used to determine the present knowledge point at least partially based on a recorded learning history of the user. The recorded learning history may include at least some information of a previous learning knowledge point, a previous user feedback, and a previous study result with respect to the previous learning knowledge point.

For example, as a returning user logs onto the learning system 600, the user interaction unit 660 may use the recorded learning history of the user to decide the first knowledge point to be studied in the new session. The first knowledge point may be the same as the last knowledge point studied by the user in the last study session. Alternatively, the user interaction unit 660 may decide that the user has finished the last knowledge point in the last study session and therefore the first knowledge point to be studied in a new session should be the next knowledge point progressive from the last knowledge point.

The analyzing means 672 is adapted to evaluate a study result of the user with respect to the present knowledge point and determine a next knowledge point to be studied by the user based on the study result. Evaluation is done by analyzing a user feedback entered through the user terminal in response to the information content provided.

In one embodiment, the analyzing means 672 is further adapted for determining whether the study result of the present knowledge point has a score that is at or above a first preset threshold. If the study result has a score that is at or above the first preset threshold, the analyzing means 672 selects a progressive knowledge point among the knowledge points based on the predetermined multilevel relationship to be the next knowledge point. The progressive knowledge point is either parallel to the present knowledge point at the same level or advancing from the present knowledge point to a higher level.

In another embodiment, the analyzing means 672 is further adapted for determining whether the study result of the present knowledge point has a score at or below a second preset threshold. If the study result has a score at or below the second preset threshold, the analyzing means 672 selects a supporting knowledge point among the knowledge points based on the predetermined multilevel relationship to be the next knowledge point. The supporting knowledge point is either the same as the present knowledge point or supplemental to the present knowledge point at the same or a lower level.

In other embodiments, analyzing means 672 may further determine a preparatory knowledge point of the present knowledge point, and directs the user to the preparatory knowledge point. Analyzing means 672 may be further adapted for determining whether to include, in the information provided to the user, an knowledge content associated with the present knowledge point and/or solutions of an evaluation content contained in the information provided to the user. The determination may be partially based on the user feedback entered in response to the evaluation content.

Ranking means 678 may be used for ranking multiple versions of the knowledge content based on the user feedbacks, such that a highly ranked version of the knowledge content is sent to a user when needed. In this embodiment, the user interaction unit 660 may be adapted for further receiving user feedbacks on multiple versions of the knowledge content associated with a knowledge point (e.g., the present knowledge point).

Recording means 670 is used for recording a learning history of the user. The learning history may include at least some information of the present knowledge point, the user feedback, and the study result.

Data 650 stored in computer storage 630 may be of any format and structure to accommodate the type of data used in the computer-based learning system 600. For example, the predefined multilevel arrangement of the knowledge points may include one or more of a tree structure, a pyramidal structure, a star structure, a chain structure, a ring structure and a grid structure of the knowledge points. The knowledge points may include preparatory knowledge points associated with at least some of knowledge points. In some embodiments, the multiple information sets in data 650 stored in computer storage 630 include multiple knowledge contents and multiple evaluation contents which are organized according to respective degrees of difficulty and inter-relationships in view of the predefined multilevel arrangement of the plurality of knowledge points.

A knowledge content contains a description of the associated knowledge point. An exemplary description is conceptually illustrative of the associated knowledge point and/or instructional on application of the associated knowledge point. An evaluation content may include one or more of an exercise, a quiz question, and a comprehensive evaluation question. In some embodiments, at least some of the knowledge contents of the knowledge points are system-provided and pre-stored in the computer-based learning system. Some of the knowledge contents of the knowledge points may be user-provided.

Figure 8:
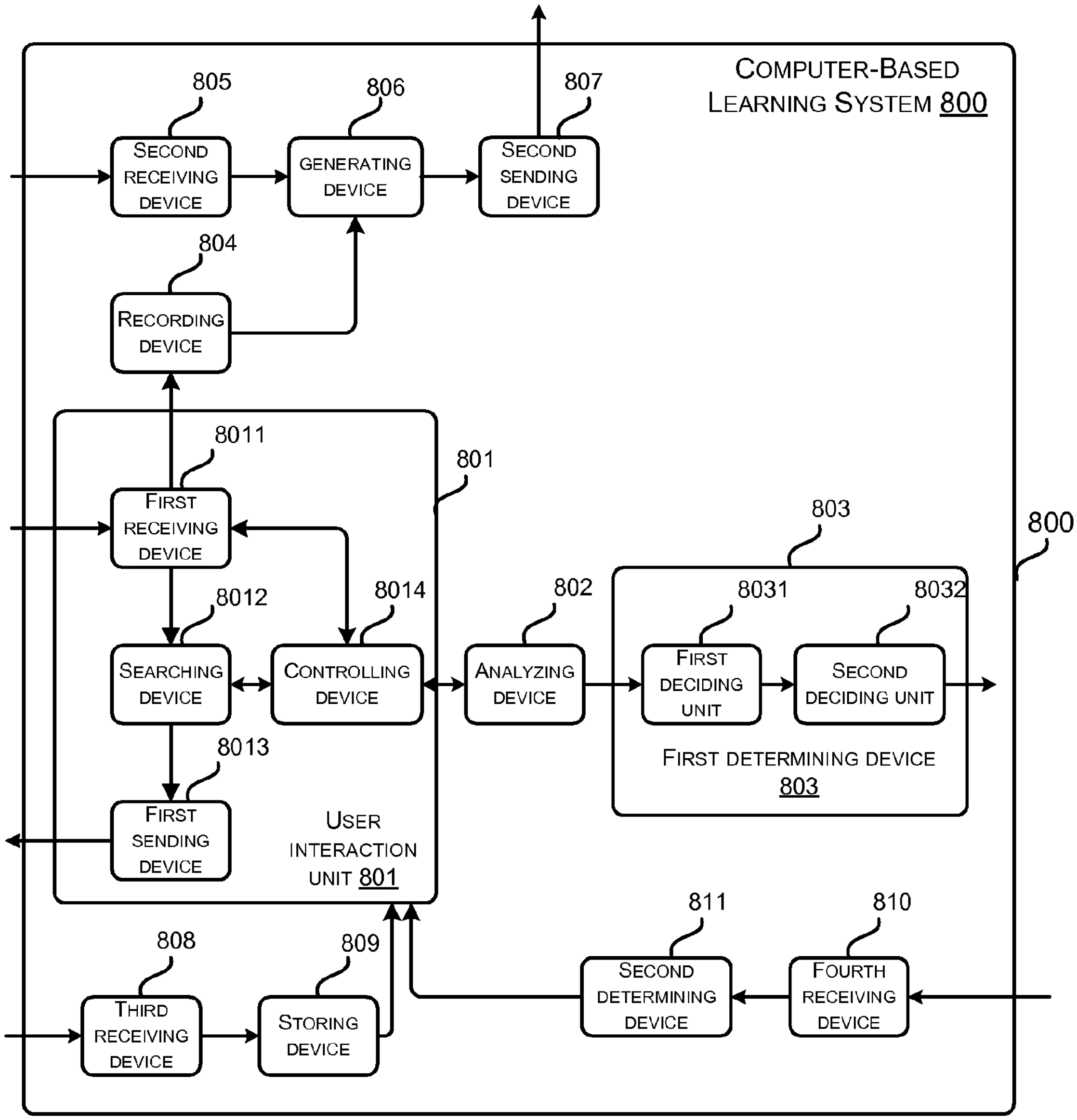
FIG. 8 is a block representation of another computer-based learning system in accordance.

FIG. 8 is a block representation of another computer-based learning system in accordance. The computer-based learning system 800 has user interaction unit 801, analyzing device 802, first determining device 803, recording device 804, second receiving device 805, generating device 806, second sending device 807, third receiving device 808, storing device 809, fourth receiving device 810 and second determining device 811. The user interaction unit 801 has first receiving device 8011, searching device 8012, first sending device 8013 and controlling device 8014. The first determining device 803 includes first deciding unit 8031 and second deciding unit 8032. The functions of the various devices of computer-based learning system 800 will be described further below. It is appreciated many devices described herein are optional. Furthermore, delineation of a first, a second, and so on for a certain device (e.g., first receiving device 8011 and second receiving device 805) does not necessarily suggest that physically separate devices are used. Instead, the delineation may be only functional, and the functions of severed devices may be performed by a single combined device.

In this description, a device is a tool or machine designed to perform a particular task or function. A device can be a piece of hardware, software, a plan or scheme, or a combination thereof, for effecting a purpose associated with the particular task or function.

The process of providing learning to the user using computer-based learning system 800 is described below with reference to FIG. 8 as well as FIG. 1 and FIG. 2.

The user interaction unit 801 interacts with a user and determines a present knowledge point based on the user input through a user terminal. The user interaction unit 801 then sends the information set of the present knowledge point to the user. For example, a user may wish to learn “Addition of Integers within Ten”. The learning system 800 manifests the knowledge point “Addition of Integers within Ten” through the user terminal. The learning system 800 also sends information of this knowledge point to the user, including an evaluation content to which the user responses with a user feedback.

The information sent to the user may include a knowledge content and an evaluation content of the selected knowledge point. The user studies the knowledge content and does exercises in the evaluation content of this knowledge point. The user terminal sends the user’s answers to the user interaction unit 801 to be analyzed by the analyzing device 802. Upon receiving the user’s answers, the analyzing device 802 analyzes the user feedback to the evaluation content of the present knowledge point according to the solutions stored to evaluate the study result of the user for that knowledge point.

The first determining device 803 then determines the next knowledge point to be studied by the user based on the study result of the user for the present knowledge point and the predefined multilayer arrangement of the knowledge point.

In one embodiment, the user interaction unit 801 is implemented with first receiving device 8011, searching device 8012, first sending device 8013 and controlling device 8014. First receiving device 8011 receives from the user terminal the user input indicating the selection of a particular knowledge point. Based on the user input and the predefined multilevel arrangement of the knowledge points, searching device 8012 finds one or more knowledge points at the next level of the selected knowledge point, along with the information set associated the selected knowledge point. First sending device 8013 then sends the next level knowledge points to the user terminal for further user selection. Controlling device 8014 controls first receiving device 8011, searching device 8012 and first sending device 8013 to perform the above operations repeatedly until searching device 8012 finds the particular knowledge point wanted by the user. First sending device 8013 then sends the information of the particular knowledge point to the user terminal. After receiving the information of the selected knowledge point, the user terminal displays the information to the user. Alternatively, this iteration ends when first receiving device 8011 receives a user command to terminate the current operation. This interactive process has also been described herein in detail with reference to FIG. 2.

Alternatively, user interaction unit 801 may send information of multiple knowledge points at multiple levels to the user together to reduce the number of interactions between user and learning system. For instance, after the user chooses the first knowledge point "Numbers", user interaction unit 801 may consider "Numbers" as a root node and send all intermediate nodes and leaf nodes as well as their interrelations to the user together. The user can then select a particular knowledge point for study.

Preferably, analyzing device 802 may also determine whether to provide the corresponding knowledge content or the solutions of the evaluation content of the knowledge point to the user based on the user feedback to the evaluation content, as described herein.

After analyzing device 802 has evaluated the study result of user with respect to the present knowledge point, first determining device 803 then determines a next knowledge point to be studied by the user. The determination may be based on the study result and the predefined multilayer arrangement of the knowledge points. An exemplary process of determining by first determining device 803 a next knowledge point to be studied by the user is described in further detail below.

In one embodiment, first determining device 803 is implemented with first deciding unit 8031 and second deciding unit 8032. First deciding unit 8031 determines whether the study result for the present knowledge point meets or surpasses a first preset threshold. If the study result meets or surpasses the first preset threshold, second deciding unit 8032 determines the next knowledge point to be studied by the user is a progressive knowledge point according to the predefined multilevel arrangement of the knowledge points. However, if the study result is lower than a second preset threshold, second deciding unit 8032 may decide that the next knowledge point to be studied by the user is a supporting knowledge point.

In another embodiment, if the learning system 800 determines that the study result of the user with respect to the present knowledge point is lower than a third preset threshold, the learning system 800 may suggest one or multiple preparatory knowledge points as the next knowledge point(s) to be studied by the user. Preferably, the information set of each knowledge point may also consist of an indication of preparatory knowledge points for that knowledge point. The preparatory knowledge points of a present knowledge point may be determined according to the predefined multilevel arrangement of the knowledge points, or according to the indication of the preparatory knowledge points for the present knowledge point. The indications of preparatory knowledge points may also be included in the predefined multilevel arrangement of the knowledge points. The indication of the preparatory knowledge point for each knowledge point can be used in combination with the evaluation content for the purpose of determining the preparatory knowledge point, as described in detail with reference to FIGS. 2-4. As described in the exemplary processes FIGS. 3-4, the first preset threshold and the second preset threshold may or may not be the same. The specific values for these thresholds may depend on the evaluation contents in the learning system.

Preferably, the learning system 800 creates a database containing user profiles and user data for users. To do this, recording device 804 records a learning history of a user each time the user uses the learning system 800. The learning history includes information of the knowledge points chosen by the user and a tracking course of the user's study results of the selected knowledge points. When user logs onto the learning system 800, the learning system 800 may either display a fixed webpage to the user or display the last visited webpage recorded in the learning history by the recording device 804.

Computer-based learning system 800 allows a user to inquire the recorded learning history. An exemplary inquiry process has been described with reference to FIG. 5. To implement the inquiry process of FIG. 5, second receiving device 805, generating device 806 and second sending device 807 are used in the computer-based learning system 800. The second receiving device 805 receives from the user an inquiry about learning history of the user. The inquiry received may include the subjects of the inquiry and a timeframe (a starting point and an ending point in time) of the learning history inquired. The generating device 806 then creates a response to the inquiry of the learning history. The second sending device 807 sends this response to the user.

Preferably, in order to improve user interaction, third receiving device 808 can also receive user content relevant to a knowledge point. Storing device 809 stores the user content in pair with the system-provided information set of the knowledge point and considers the user content as another version of the information set of the knowledge point. This user content can then be provided to any future user who studies this knowledge point.

With user contents received from user, the information sets of some knowledge points may have more than one version. Preferably, fourth receiving device 810 is use to further receive user feedback about the different versions of the information set of each knowledge point. Second determining device 811 users the user feedbacks to determine which version among the multiple versions is a better version.

The computer-based learning system described herein (e.g., 600 and 800) is preferably implemented in a server or a cluster of servers over the Internet. Alternatively, the computer-based learning system 800 may be an individual computing device separated from a networked learning system and interacts with the networked learning system. In the latter configuration, data of system-provided contents and data of user-provided contents may be stored (either selectively allocated or redundantly stored on both) on either or both the local computer-based learning system 800 and the networked learning system, and transmitted therebetween automatically or periodically.

Combined with the predefined multilevel arrangement of knowledge points, the method and the learning system described in this disclosure provide a different learning course for different users. For each individual, education is first differentiated to knowledge points and then integrated through dynamic user-system interaction, a process quite analogous to differential calculus in mathematics. Learning becomes an objective, personalized and dynamic process, and no longer has to depend on frigid curriculums. The learning system may also record the learning history of each user to facilitate reviews by user at any time. Furthermore, the method and the learning system encourage the users to provide or suggest their own knowledge content and evaluation content, and further receive user feedbacks on the knowledge contents and evaluation contents to allow more user participation. By allowing user-generated content and using Internet-based database management, the disclosed learning system may become democratic, self-generating, self-adjusting, self-evolving, self-improving and self-expanding, thus taking fuller advantage of the next-generation Internet, Web 2.0.

It is noted that the method and system for individualized learning described herein may be adapted to any type of education, and is not limited to studying regular courses found in schools from kindergarten to colleagues. The method and system may also be used for training courses in various industries. For example, the method and system may be used for training in High-Volume Manufacturing with respect to various technical subjects such as Yield, Test, Inline Defect Monitor, Process Parameter Monitor, Semiconductor Processing, and Product Reliability. Each technical subject can be further divided into sub-subjects, and so on. For example, Semiconductor Processing may include lithography, etching, wet cleaning, diffusion and thermal processing/laser annealing, chemical mechanical polishing, et cetera. The knowledge of these various subjects may be analyzed and organized into predefined multilevel arrangements of knowledge points to be learned using the method and system described herein. The learning process can be individualized with various focuses according to each individual's background and capabilities, potentially improving the efficiency and convenience of the training and lowering the high training costs in these industries.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method using a computer-based learning system to provide user learning, wherein the computer-based learning system includes multiple information sets each associated with at least one of a plurality of knowledge points organized according to a predefined multilevel arrangement, at least some of the multiple information sets each having multiple versions of an information content which is a knowledge content, an evaluation content or a solution content, the method comprising:

(a) determining a present knowledge point and a preferred version among the multiple versions of the information content of the information set associated with the present knowledge point to be studied by a user, and providing to the user the preferred version of the information content, wherein the determining is based at least in part on feedbacks from multiple users on the multiple versions of the information content;

(b) evaluating a study result of the user with respect to the present knowledge point by analyzing a user feedback entered through a user terminal in response to the preferred version of the information content provided to the user; and (c) automatically determining a next knowledge point to be studied by the user based on the study result and the predefined multilevel arrangement of the knowledge points.

2. The method as recited in claim 1, wherein determining the present knowledge point comprises:

(a1) receiving a user input through a user terminal, the user input indicating a user selection of a current level knowledge point among the plurality of knowledge points;

(a2) finding one or more next level knowledge points according to the predefined multilevel arrangement of the plurality of knowledge points and/or the multiple information sets associated with the respective knowledge points;

(a3) displaying the next level knowledge points to the user; and (a4) iterating (a1), (a2) and (a3) until the present knowledge point is determined, or until receiving a user indication to end operation.

3. The method as recited in claim 1, wherein determining the present knowledge point is done at least partially based on a recorded learning history of the user, the learning history including at least some information of a previous learning knowledge point, a previous user feedback, and a previous study result with respect to the previous learning knowledge point.

4. The method as recited in claim 1, further comprising:

receiving from the user an inquiry about user learning history;

generating a response to the inquiry, the response including a recorded learning history of the user; and sending the response to the user terminal.

5. The method as recited in claim 1, wherein determining the next knowledge point to be studied by the user comprises:

determining whether the study result of the present knowledge point has a score at or above a first preset threshold; and if the study result has a score at or above the first preset threshold, selecting a progressive knowledge point among the plurality of knowledge points based on the predetermined multilevel relationship to be the next knowledge point, wherein the progressive knowledge point is either parallel to the present knowledge point at a same level or advancing from the present knowledge point to a higher level.

6. The method as recited in claim 1, wherein determining the next knowledge point to be studied by the user comprises:

determining whether the study result of the present knowledge point has a score at or below a second preset threshold; and if the study result has a score at or below the second preset threshold, selecting a supporting knowledge point among the plurality of knowledge points based on the predetermined multilevel relationship to be the next knowledge point, wherein the supporting knowledge point is either the same as the present knowledge point or supplemental to the present knowledge point at a same or a lower level.

7. The method as recited in claim 1, further comprising:

determining a preparatory knowledge point of the present knowledge point; and directing the user to the preparatory knowledge point.

8. The method as recited in claim 7, wherein determining the preparatory knowledge point comprises:

looking up a preparatory knowledge point indication associated with the present knowledge point in the predefined multilevel arrangement of the plurality of knowledge points.

9. The method as recited in claim 7, wherein determining the preparatory knowledge point is based on evaluating the study result of the user with respect to the present knowledge point by analyzing the user feedback entered in response to the preferred version of the information content associated with the present knowledge point.

10. The method as recited in claim 9, wherein the preferred version of the information content associated with the present knowledge point comprises an evaluation content containing multiple test points for testing multiple knowledge points including the present knowledge point and the preparatory knowledge point, and evaluating the study result of the user comprises evaluating the multiple test points to determine the preparatory knowledge point.

11. The method as recited in claim 1, wherein the next knowledge point is a preparatory knowledge point of the present knowledge point, the preparatory knowledge point being determined based on the predefined multilevel arrangement of the plurality of knowledge points and the study result of the user with respect to the present knowledge point.

12. The method as recited in claim 1, further comprising:

determining a group of knowledge points suited for study of the user, the group of knowledge points being selected from the plurality of knowledge points organized according to the predefined multilevel arrangement; and adjusting a knowledge point in the group of knowledge points according to the user feedback provided in relation to one or more knowledge points in the group of knowledge points.

13. The method as recited in claim 1, wherein the preferred version of the information content provided to the user includes a knowledge content of the present knowledge point.

14. The method as recited in claim 1, the method further comprising:

receiving the feedbacks from the multiple users on the multiple versions of the information content;

ranking the multiple versions of the information content based on the feedbacks from the multiple users; and selecting a highly ranked version of the information content as the preferred version of the information content to be provided to the user as a result of the determining the present knowledge point.

15. The method as recited in claim 1, further comprising:

receiving a user-provided information content associated with one or more of the plurality of knowledge points; and storing the user-provided information content along with a system-provided information content associated with the one or more of the plurality of knowledge points, the user-provided information content being used as an alternative or supplement to the system-provided information content.

16. The method as recited in claim 1, wherein evaluating the study result of the user with respect to the present knowledge point comprises:

determining whether to include, in the preferred version of the information content provided to the user, a knowledge content associated with the present knowledge point and/or solutions of an evaluation content, the determination being at least partially based on the user feedback entered in response to the evaluation content.

17. The method as recited in claim 1, wherein the information set associated with the present knowledge point has an evaluation content including one or more of an exercise, a quiz question, and a comprehensive evaluation question.

18. The method as recited in claim 1, wherein the information contents of at least some of the knowledge points are organized according to respective degrees of difficulty and inter-relationships in view of the predefined multilevel arrangement of the plurality of knowledge points.

19. The method as recited in claim 1, wherein at least one information set includes multiple information contents which are organized according to respective degrees of difficulty and inter-relationships in view of the associated knowledge point.

20. The method as recited in claim 1, wherein the predefined multilevel arrangement includes one or more of a tree structure, a pyramidal structure, a star structure, a chain structure, a ring structure and a grid structure of the plurality of knowledge points.

21. The method as recited in claim 1, further comprising:

recording a learning history of the user, the learning history including at least some information of the present knowledge point, the user feedback, and the study result.

22. The method as recited in claim 21, further comprising:

receiving from the user an inquiry of the learning history;

generating an inquiry response message according to the inquiry of the learning history, the inquiry response message including inquired learning history of the user; and sending the inquiry response message to the user terminal which presents to the user the inquired learning history of the user.

23. The method as recited in claim 1, wherein the information set associated with the present knowledge point includes previously recorded feedback of the user to the present knowledge point.

24. One or more non-transitory computer readable media having stored thereupon data for multiple information sets and a plurality of instructions, wherein the multiple information sets are each associated with at least one of a plurality of knowledge points organized according to a predefined multilevel arrangement, each information set having at least one information content which is a knowledge content, an evaluation content or a solution content, wherein at least one information content associated with at least one knowledge point is a user-provided information content, and wherein the plurality of instructions, when executed by one or more processors, causes the processor(s) to perform the following actions:

(a) determining a present knowledge point to be studied by a user and providing to the user the at least one information content associated with the present knowledge point;

(b) evaluating a study result of the user with respect to the present knowledge point by analyzing a user feedback entered through a user terminal in response to the at least one information content provided to the user; and (c) determining a next knowledge point to be studied by the user based on the study result and the predefined multilevel arrangement of the knowledge points.

25. The one or more non-transitory computer-readable media as recited in claim 24, wherein the action of determining the present knowledge point comprises:

receiving a user input through a user terminal, the user input indicating a user selection of a current level knowledge point among the plurality of knowledge points;

finding one or more next level knowledge points according to the predefined multilevel arrangement of the plurality of knowledge points and/or the multiple information sets associated with the respective knowledge points;

displaying the next level knowledge points to the user; and iterating the receiving, the finding and the displaying until the present knowledge point is determined, or until receiving a user indication to end operation.

26. The one or more non-transitory computer-readable media as recited in claim 24, wherein the action of determining the present knowledge point is done at least partially based on a recorded learning history of the user, the learning history including at least some information of a previous learning knowledge point, a previous user feedback, and a previous study result with respect to the previous learning knowledge point.

27. The one or more non-transitory computer-readable media as recited in claim 24, the actions further comprising:

receiving from the user an inquiry about user learning history;

generating a response to the inquiry, the response including a recorded learning history of the user; and sending the response to the user terminal.

28. The one or more non-transitory computer-readable media as recited in claim 24, wherein the action of determining the next knowledge point to be studied by the user comprises:

determining whether the study result of the present knowledge point has a score at or above a first preset threshold; and if the study result has a score at or above the first preset threshold, selecting a progressive knowledge point among the plurality of knowledge points based on the predetermined multilevel relationship to be the next knowledge point, wherein the progressive knowledge point is either parallel to the present knowledge point at a same level or advancing from the present knowledge point to a higher level.

29. The one or more non-transitory computer-readable media as recited in claim 24, wherein the action of determining the next knowledge point to be studied by the user comprises:

determining whether the study result of the present knowledge point has a score at or below a second preset threshold; and if the study result has a score at or below the second preset threshold, selecting a supporting knowledge point among the plurality of knowledge points based on the predetermined multilevel relationship to be the next knowledge point, wherein the supporting knowledge point is either the same as the present knowledge point or supplemental to the present knowledge point at a same or a lower level.

30. The one or more non-transitory computer-readable media as recited in claim 24, the actions further comprising:

determining a preparatory knowledge point of the present knowledge point; and directing the user to the preparatory knowledge point.

31. The one or more non-transitory computer-readable media as recited in claim 30, wherein determining the preparatory knowledge point comprises:

looking up a preparatory knowledge point indication associated with the present knowledge point in the predefined multilevel arrangement of the plurality of knowledge points.

32. The one or more non-transitory computer-readable media as recited in claim 30, wherein the action of determining the preparatory knowledge point is based on evaluating the study result of the user with respect to the present knowledge point by analyzing the user feedback entered in response to the evaluation content.

33. The one or more non-transitory computer-readable media as recited in claim 32, wherein the at least one information content of the information set associated with the present knowledge point comprises an evaluation content containing multiple test points for testing multiple knowledge points including the present knowledge point and the preparatory knowledge point, and evaluating the study result of the user comprises evaluating the multiple test points to determine the preparatory knowledge point.

34. The one or more non-transitory computer-readable media as recited in claim 24, wherein the next knowledge point is a preparatory knowledge point of the present knowledge point, the preparatory knowledge point being determined based on the predefined multilevel arrangement of the plurality of knowledge points and the study result of the user with respect to the present knowledge point.

35. The one or more non-transitory computer-readable media as recited in claim 24, the actions further comprising:

determining a group of knowledge points suited for study of the user, the group of knowledge points being selected from the plurality of knowledge points organized according to the predefined multilevel arrangement; and adjusting a knowledge point in the group of knowledge points according to the user feedback provided in relation to one or more knowledge points in the group of knowledge points.

36. The one or more non-transitory computer-readable media as recited in claim 24, wherein the information set associated with the present knowledge point has an information content in multiple versions, the actions further comprising:

receiving user feedbacks on the multiple versions of the information content;

ranking the multiple versions of the information content based on the user feedbacks; and providing a highly ranked version of the information content to the user.

37. The one or more non-transitory computer-readable media as recited in claim 24, the actions further comprising:

receiving the user-provided information content associated with one or more of the plurality of knowledge points; and storing the user-provided information content along with a system-provided information content associated with the one or more of the plurality of knowledge points, the user-provided information content being used as an alternative or supplement to the system-provided information content.

38. The one or more non-transitory computer-readable media as recited in claim 24, the actions further comprising:

recording a learning history of the user, the learning history including at least some information of the present knowledge point, the user feedback, and the study result.

39. A method comprising:

determining, by one or more processors, a present knowledge point to be studied by a user of a computer-based learning system, the computer-based learning system including multiple information sets each associated with at least one of a plurality of knowledge points organized according to a predefined multilevel arrangement, each information set having at least one information content that is one of: a knowledge content, an evaluation content, or a solution content, providing to the user, through a user terminal, at least one information content of the information set associated with the present knowledge point;

evaluating a study result of the user with respect to the present knowledge point by analyzing a user feedback entered through the user terminal in response to the at least one information content provided to the user;

determining, by the one or more processors, a next knowledge point to be studied by the user based on the study result from analyzing the user feedback entered through the user terminal and the predefined multilevel arrangement of the knowledge points;

determining an information content associated with the next knowledge point based at least in part on feedbacks from multiple users on multiple versions of the information content; and providing to the user, through the user terminal, the information content associated with the next knowledge point.

40. The method as recited in claim 39, wherein determining the present knowledge point comprises:

receiving a user input through a user terminal, the user input indicating a user selection of a current level knowledge point among the plurality of knowledge points;

finding one or more next level knowledge points according to the predefined multilevel arrangement of the plurality of knowledge points and/or the multiple information sets associated with the respective knowledge points;

displaying the next level knowledge points to the user; and iterating the receiving, the finding and the displaying until the present knowledge point is determined, or until receiving a user indication to end operation.

41. The method as recited in claim 39, wherein determining the present knowledge point is done at least partially based on a recorded learning history of the user, the learning history including at least some information of a previous learning knowledge point, a previous user feedback, and a previous study result with respect to the previous learning knowledge point.

42. The method as recited in claim 39, further comprising:

receiving from the user an inquiry about user learning history;

generating a response to the inquiry, the response including a recorded learning history of the user; and sending the response to the user terminal.

43. The method as recited in claim 39, wherein determining the next knowledge point to be studied by the user comprises:

determining whether the study result of the present knowledge point has a score at or above a first preset threshold; and if the study result has a score at or above the first preset threshold, selecting a progressive knowledge point among the plurality of knowledge points based on the predetermined multilevel relationship to be the next knowledge point, wherein the progressive knowledge point is either parallel to the present knowledge point at a same level or advancing from the present knowledge point to a higher level.

44. The method as recited in claim 39, wherein determining the next knowledge point to be studied by the user comprises:

determining whether the study result of the present knowledge point has a score at or below a second preset threshold; and if the study result has a score at or below the second preset threshold, selecting a supporting knowledge point among the plurality of knowledge points based on the predetermined multilevel relationship to be the next knowledge point, wherein the supporting knowledge point is either the same as the present knowledge point or supplemental to the present knowledge point at a same or a lower level.

* * * * *